(12) United States Patent
Mankovsky et al.

(10) Patent No.: US 8,015,158 B1
(45) Date of Patent: Sep. 6, 2011

(54) COPY-LESS RESTORING OF TRANSACTION FILES OF A DATABASE SYSTEM

(75) Inventors: Michael Mankovsky, Gilroy, CA (US); Qing Zhang, Chapel Hill, NC (US)

(73) Assignee: NetApp, Inc., Sunnyvale, CA (US)

( * ) Notice: Subject to any disclaimer, the term of this patent is extended or adjusted under 35 U.S.C. 154(b) by 491 days.

(21) Appl. No.: 11/789,083

(22) Filed: Apr. 23, 2007

(51) Int. Cl.
G06F 7/00 (2006.01)
G06F 17/00 (2006.01)

(52) U.S. Cl. .................................. 707/653; 707/648

(58) Field of Classification Search ............ 707/1–10, 707/100–104.1, 648, 653
See application file for complete search history.

(56) References Cited

U.S. PATENT DOCUMENTS

| | | | | |
|---|---|---|---|---|
| 6,499,137 | B1 * | 12/2002 | Hunt ........................... | 717/164 |
| 2004/0210608 | A1 * | 10/2004 | Lee et al. .................... | 707/204 |
| 2005/0193245 | A1 * | 9/2005 | Hayden et al. ............... | 714/13 |

OTHER PUBLICATIONS

U.S. Appl. No. 10/090,963, filed Mar. 5, 2002, Chapman.

* cited by examiner

*Primary Examiner* — Syling Yen
*Assistant Examiner* — Navneet K Ahluwalia
(74) *Attorney, Agent, or Firm* — Stattler-Suh PC

(57) ABSTRACT

A mechanism is provided for archiving and restoring transaction files of a database system without requiring the copying of the transaction files. A server system executes a host application that implements the database system comprising a set of database files and a set of transaction files that contains updates to the set of database files, the files being stored in a storage system. A backup engine interacts with the host application to archive a transaction file having an original filename in an original directory by creating a corresponding archive filename to the transaction file in an archive directory. The archive transaction files may be used later to perform a copy-less restore process of the database system that does not require copying of any transaction files. The copy-less restore process restores any altered original filenames by replacing, in the original directory, an altered original filename with its corresponding archive filename.

18 Claims, 13 Drawing Sheets

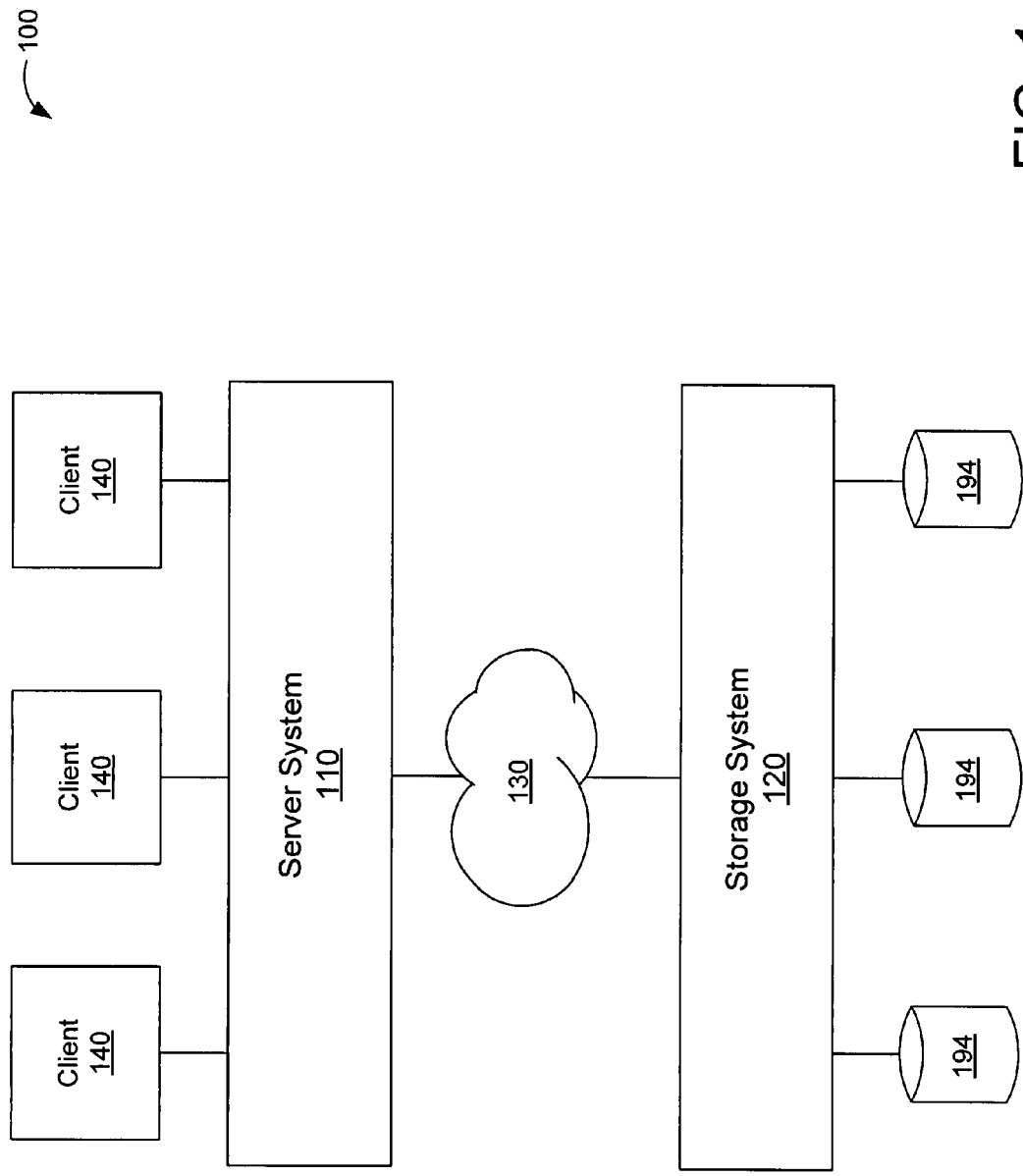

194

Database Files

Original Database Directory | Archive Database Directory

Database File 1 | Database File 1

Database File 2 | Database File 2

Database File 3 | Database File 3

⋮ | ⋮

Transaction Files

Original Transaction Directory | Archive Transaction Directory

Transaction File 1 | Transaction File 1

Transaction File 2 | Transaction File 2

Transaction File 3 | Transaction File 3

Transaction File 4 | Transaction File 4

⋮ | ⋮

Metadata Files

Metadata File 1

Metadata File 2

COPY-LESS RESTORING OF TRANSACTION FILES OF A DATABASE SYSTEM

FIELD OF THE INVENTION

Embodiments of the present invention relate to database storage systems, and in particular, to restoring transaction files of a database storage system without copying the transaction files.

BACKGROUND

A storage system is a processing system adapted to store and retrieve information/data on storage devices, such as disks. The storage system includes a storage operating system that implements a file system to logically organize the information as a hierarchical structure of directories and files on the disks. Each "on-disk" file may be implemented as a set of disk blocks configured to store information, such as text, whereas each directory may be implemented as a specially-formatted file in which information about other files and directories are stored.

The storage operating system generally refers to the computer-executable code operable on a storage system that manages data access and access requests and may implement file system semantics in implementations involving storage systems. In this sense, the Data ONTAP™ storage operating system, available from Network Appliance, Inc. of Sunnyvale, Calif., which implements a Write Anywhere File Layout (WAFL™) file system, is an example of such a storage operating system implemented as a microkernel within an overall protocol stack and associated disk storage. The storage operating system can also be implemented as an application program operating over a general-purpose operating system, such as UNIX® or Windows®, or as a general-purpose operating system with configurable functionality, which is configured for storage applications as described herein.

A storage system's disk storage is typically implemented as one or more storage volumes that comprise physical storage disks, defining an overall logical arrangement of storage space. Available storage system implementations can serve a large number of discrete volumes (150 or more, for example). A storage volume is "loaded" in the storage system by copying the logical organization of the volume's files, data and directories into the storage system's memory. Once a volume has been loaded in memory, the volume may be "mounted" by one or more users, applications, devices, etc. permitted to access its contents and navigate its namespace. As used herein, a volume is said to be "in use" when it is loaded in a storage system's memory and at least one user, application, etc. has mounted the volume and modified its contents.

A storage system may be configured to allow clients to access files stored on a storage system. In this model, the client may comprise an application executing on a computer that "connects" to the storage system over a computer network, such as a point-to-point link, shared local area network (LAN), wide area network (WAN), or virtual private network (VPN) implemented over a public network such as the Internet. Communications between the storage system and its clients are typically embodied as packets sent over the computer network. Each client may request the services of the storage system by issuing file-system protocol messages formatted in accordance with a conventional file-system protocol, such as the Common Internet File System (CIFS), Network File System (NFS) protocol, Fibre Channel Protocol (FCP), or Internet Small Computer System Interface (iSCSI) Storage Area Network (SAN) access.

A storage system may be also be used to implement a database system, such as an electronic message (email) database system containing email data for a plurality of clients. An email database system typically comprises database files and transaction files. The database files contain email information that has been received and fully processed by the database system and organized and stored in a particular format by the database system. Transaction files contain additional email information that has not been organized and stored in the same format as the database files by the database system. Transaction files contain email information that may or may not be currently reflected in the database files. Typically, the information contained in the transaction files are integrated into the database files according to a predetermined schedule.

A storage system is also used to implement a backup of the transaction files of the database system. The original transaction files of the database system are stored in a particular directory in the storage system. Conventionally, a backup of the transaction files includes copying all transaction files contained in the original directory and storing the copied files in an archive directory on the storage system. As such, after a backup of the transaction files, there exists a set of transaction files in the original directory and a duplicate set of transaction files in the archive directory.

Since copies of transaction files are created and stored to a second directory (the archive directory), a conventional backup of transaction files consumes significant amounts of time and resources of the storage system (e.g., it requires intensive input/output operations of the storage system and requires significant storage space). As such, there is a need for a more efficient and less resource intensive method for backing up (archiving) and restoring transaction files of a database system.

SUMMARY

The embodiments described below provide a mechanism for archiving and restoring transaction files of a database system without requiring the copying of the transaction files. A server system executes a host database application that implements a database system (comprising a set of one or more database files and a set of one or more transaction files) that is stored on a storage system. The server system also executes a backup management engine that implements a backup of the database system (i.e., to archive database and transaction files of the database system). A transaction file backup module of the backup management engine may archive transaction files of the database system by creating an additional filename/hardlink to the transaction files in an archive directory. As used herein, the term "filename" or "hardlink" indicates a pointer that points to or references a particular file.

The database and transaction files are stored on the storage system which is connected with the server system, the storage system comprising one or more storage volumes. The database files contain information for a plurality of clients that has been received and fully processed by the host database application and organized and stored in a particular format by the host database application. Additional information (e.g., regarding transactions) for the plurality of clients that is received by the host database application is logged to one or more transaction files. Transaction files contain information that may or may not be currently reflected ("integrated") in the database files.

The host database application creates and stores transaction files to a particular directory of a particular volume of the storage system. As referred to herein, the host database application creates and stores "original" transaction files (having "original" transaction filenames) to an "original" directory of the storage system (the transaction files being referred to as "original" transaction files since these are the transaction files to be archived/backed up). As well known in the art, in most file systems, a file that is stored in a particular directory is, in fact, a filename that is stored in the particular directory, where the filename is a pointer to the actual file that is stored elsewhere in the storage system. Therefore, the host database application, in fact, creates and stores an "original" filename in an original directory of a volume of the storage system, and stores the actual original transaction file elsewhere in the volume.

The transaction file backup module of the backup management engine may archive original transaction files by creating new archive filenames/hardlinks to the original transaction files in an archive directory. Rather than creating copies of the original transaction files, new archive filenames/hardlinks to the original transaction files are created and stored to a second directory (the archive directory). As part of the backup of the transaction files, the host database application may then truncate unneeded original transaction files in the original directory. The unneeded original transaction files comprise transaction files that have already been integrated into the database files. These unneeded original transaction files are typically deleted after a full backup of the original transaction files. The host database application may delete the original transaction filenames (stored in the original directory) of the unneeded original transaction files.

As well known in the art, deletion of a filename of a file stored in a volume requires a number of steps by the file system of the volume which may or may not cause the file itself to be deleted. Each file (i.e., actual file data) in a volume has an associated link counter that indicates the number of filenames that point to the file. When a filename in a particular directory that points to a particular file is requested to be deleted, the file system checks the link counter associated with the particular file. If the associated link counter is 1, that means the filename requested to be deleted is the only filename that points to the particular file and the file system then deletes the filename as well as the particular file. If the associated link counter is greater than 1, that means the filename requested to be deleted is not the only filename that points to the particular file and the file system then deletes only the filename (and also decrements the associated link) but not the particular file.

The host database application may perform a truncation process by deleting the original filenames (stored in the original directory) to the unneeded original transaction files. Since each original transaction file will have two filenames that point to the original transaction file (the original filename in the original directory and the archive filename in the archive directory), the file system will only delete the original filename in the original directory but will not delete the original transaction file. The original transaction file will still be kept for the archive filename that refers to it.

Typically, a backup process is performed on the database system so that the files of the database system may be restored at a later time if needed. Conventionally, an original transaction file that has become altered (e.g., corrupted or deleted) is restored using its corresponding archive transaction file by replacing the original transaction file with a copy of corresponding archive transaction file. In some embodiments, however, the archive transaction filenames are later used by the backup management engine to perform a "copy-less" restore of the database system. In these embodiments, the archive transaction filenames in the archive directory may be used to restore original transaction filenames in the original directory that may have become altered (e.g., corrupted or deleted). During the "copy-less" restore process, it is determined whether the original transaction filenames in the original directory have been altered. If so, the altered original transaction filenames in the original directory are replaced by corresponding archive transaction filenames in the archive directory. As referred to herein, if a particular original transaction filename refers to a particular original transaction file, an archive transaction filename "corresponding" to the particular original transaction filename refers to the filename in the archive directory that was newly created by the copy-less method to point to the same particular original transaction file. Typically, the original transaction filename and the "corresponding" archive transaction filename will be the same or similar.

Note that in these embodiments, a "copy-less" restore process is performed in that no archive transaction files are actually copied during the process. Rather, original transaction filenames may be replaced by archive transaction filenames if the original transaction filenames have become altered. By doing so, copies of the archive transaction files do not need to be created to replace corresponding original transaction files. This significantly reduces the disk space consumption of the storage system and the server system and storage subsystem workload, while increasing the efficiency and speed of restoring transaction files. By avoiding copying of actual archive transaction files, the method avoids use of the storage subsystem I/O required to copy the files, and reduces disk space consumption on the storage system that would result from file duplication.

A database system comprising a set of database files and a set of transaction files is described herein for illustrative purposes only. In other embodiments, the copy-less archive and restore processes may be used for any other type of file or data container. As such, the embodiments described herein should not be construed as being restricted to only database systems and database files.

Other aspects of the invention will become apparent from the following detailed description taken in conjunction with the accompanying drawings, which illustrate various embodiments by way of example.

BRIEF DESCRIPTION OF THE DRAWINGS

FIG. 1 is a schematic block diagram of an exemplary storage system environment in which some embodiments operate;

FIG. 4A shows a conceptual diagram of exemplary database, transaction, and backup metadata files that are produced by a full backup;

DETAILED DESCRIPTION

System Architecture

Figure 2A:
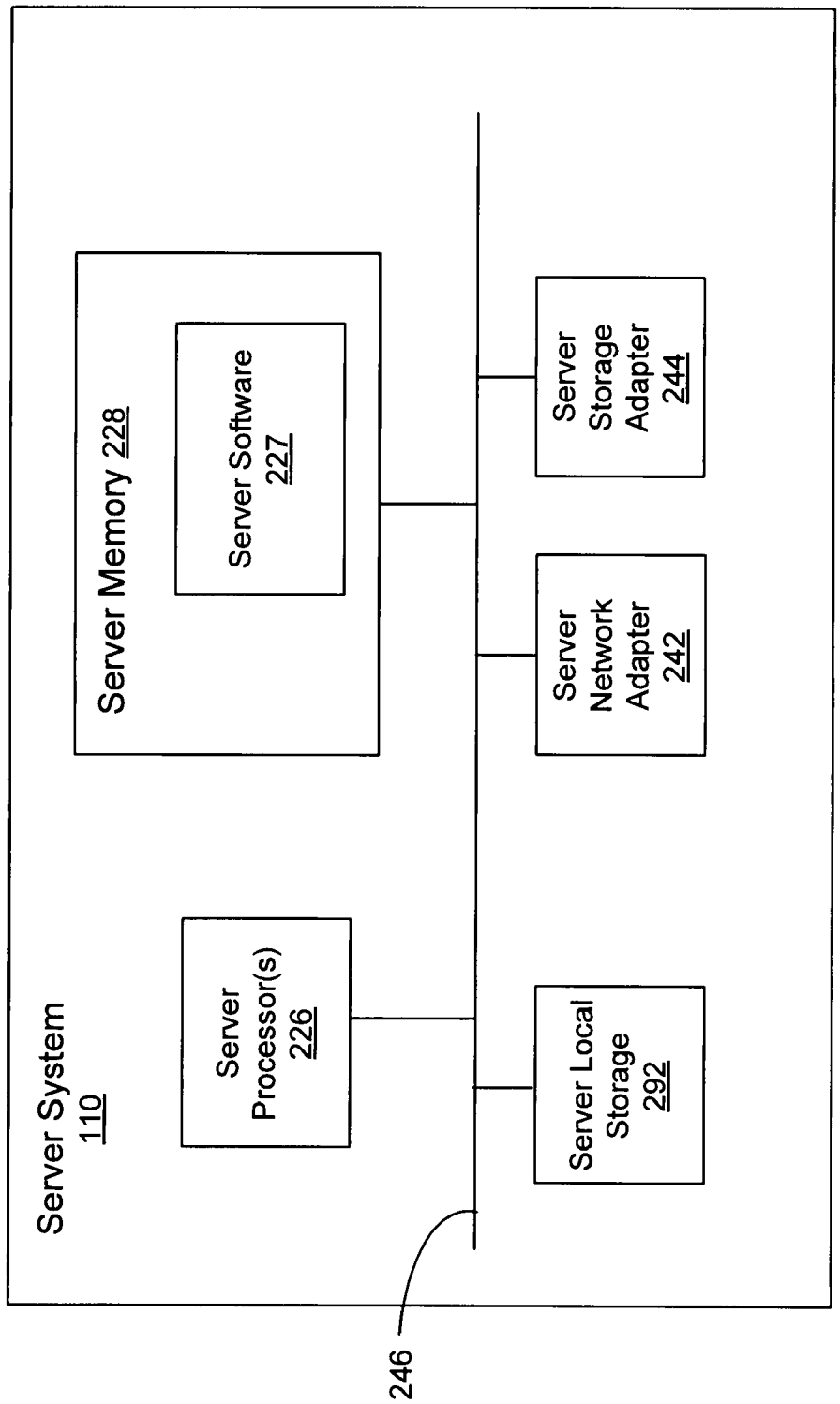
FIG. 2A is a schematic block diagram of an exemplary server system that may be employed in the storage system environment of FIG. 1.

FIG. 1 is a schematic block diagram of an exemplary storage system environment 100 in which some embodiments operate. The environment 100 comprises a server system 110 connected to multiple client computers 140 via a network. The environment 100 further comprises a storage system 120 (having a set of mass storage devices 194 providing a set of storage volumes) connected to the server system 110 via a connection system 130.

Server system 110 is a computer that handles requests for data, electronic mail, file transfers, or other network services from client computers 140. Server system 110 can be connected to clients 140 over a network, such as a Local Area Network (LAN), Wide Area Network (WAN), or the like. Server system 110 may execute applications including host database applications, such as Microsoft™ Exchange Server provided by Microsoft Corp., of Redmond, Wash. Microsoft Exchange Server is a messaging and collaboration software system that provides support for electronic mail (email) to various clients (such as clients 140) connected to server system 110. Microsoft Exchange Server creates and maintains an email database system comprising email information contained in database and transaction files. Various clients 140 access the email information on the email database system using client applications (such Web browsers or email client applications). A person of ordinary skill in the art would understand that although the present invention is described in the context of Microsoft Exchange Server for illustrative purposes only, server system 110 can execute other host database applications that create and maintain database and transaction files containing information not relating to emails.

Server system 110 utilizes services of storage system 120 to store and manage data (such as database and transaction files) in a set of mass storage devices 194. Interaction between server system 110 and storage system 120 can enable the provision of storage services. That is, server system 110 may request the services of the storage system 120, and the storage system 120 may return the results of the services requested by the server system 110, by exchanging packets over the connection system 130. The server system 110 may issue packets using file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the server system 110 may issue packets including block-based access protocols, such as the Small Computer Systems Interface (SCSI) protocol encapsulated over TCP (iSCSI) and SCSI encapsulated over Fibre Channel (FCP), when accessing information in the form of blocks. Storage system 120 is coupled locally to server system 110 over connection system 130, such as a local area network (LAN), a wide area network (WAN), metropolitan are network (MAN) or the Internet.

As described herein, storage system 120 stores data in a set of mass storage devices 194, preferably on one or more writable storage device media (such as magnetic disks, video tape, optical, DVD, magnetic tape, and any other similar media adapted to store information, including data and parity information). For illustrative purposes, however, as described herein, the data is stored on disks 194. The disks 194 within a volume are typically organized as one or more groups of Redundant Array of Independent (or Inexpensive) Disks (RAID). Server system 110 utilizes services of storage system 120 to store and manage database and transaction files in a set of mass disks 194 that provide a set of storage volumes. As known in the art, a disk 194 may have one or more storage volumes, where each volume has a file system implemented on the volume. A file system implemented on the disks 194 may provide multiple directories in a single volume, each directory containing zero or more filenames. A file system provides a logical/virtual representation of how data (files) are organized on a volume, where data (files) are represented as filenames that are organized in one or more directories. Examples of common file systems include New Technology File System (NTFS), File Allocation Table (FAT), Hierarchical File System (HFS), Universal Disk Format (UDF), UNIX® file system, etc.

In some embodiments, the host database application (e.g., Microsoft Exchange Server) creates and maintains one or more database systems comprising a "storage group." Each database system of a storage group share the same set of transaction files (i.e., write new information to the same set of transaction files). For example, for a storage group comprising two database systems, the storage group comprises a first set of database files and a second set of database files, whereby new information to be integrated into the first and second sets of database files are written/logged to a single shared set of transaction files. In these embodiments, an archive directory is designated for each storage group to contain the additional archive filenames/hardlinks that reference the shared set of transaction files for the storage group. In some embodiments, the archive directory for a storage group is designated in a same volume as the volume storing the shared set of transaction files for the storage group.

FIG. 2A is a schematic block diagram of an exemplary server system 110 that may be employed in the storage system environment of FIG. 1. The server system 110 comprises server processor(s) 226, server memory 228, a server network adapter 242, a server storage adapter 244, and a server local storage 292 coupled by a bus 246.

The server processors 226 are the central processing units (CPUs) of the server system 110 and, thus, control the overall operation of the server system 110. In certain embodiments, the server processors 226 accomplish this by executing software, such as that described in more detail herein. Server processors 226 may include one or more programmable general-purpose or special-purpose microprocessors, digital signal processors (DSPs), programmable controllers, application specific integrated circuits (ASICs), programmable logic devices (PLDs), or the like, or a combination of such devices.

Server memory 228 comprises storage locations that are addressable by the processor 226 and adapters (a server network adapter 242 and a server storage adapter 244) for storing software program code, such as server software 227 and database structures associated with some embodiments. The server processor 226 and server adapters may, in turn, comprise processing elements and/or logic circuitry configured to execute the software code and manipulate various database structures. Server memory 228 can be a random access memory (RAM), a read-only memory (ROM), or the like, or a combination of such devices. It will be apparent to those skilled in the art that other processing and memory means, including various computer readable media, may be used for storing and executing program instructions pertaining to the invention described herein.

The server network adapter 242 comprises a plurality of ports adapted to couple the server system 110 to one or more clients 140 (shown in FIG. 1) over point-to-point links, wide area networks, virtual private networks implemented over a public network (Internet) or a shared local area network. The server network adapter 242 thus may comprise the mechanical, electrical and signaling circuitry needed to connect the node to the network.

The server storage adapter 244 cooperates with the server operating system 224 executing on the server system 110 to access data (such as database and transaction files) from disks 194 (shown in FIG. 1). The server storage adapter 244 comprises a plurality of ports having input/output (I/O) interface circuitry that couples to the disks 194 over an I/O interconnect arrangement, such as a conventional high-performance, fibre channel (FC) link topology. Server local storage 292 is a device that stores information within server system 110, such as server software 227, server operating system 224, and data. Server system 110 loads server software 227 into server memory 228 from which they are accessed by server processors 226.

Figure 2B:
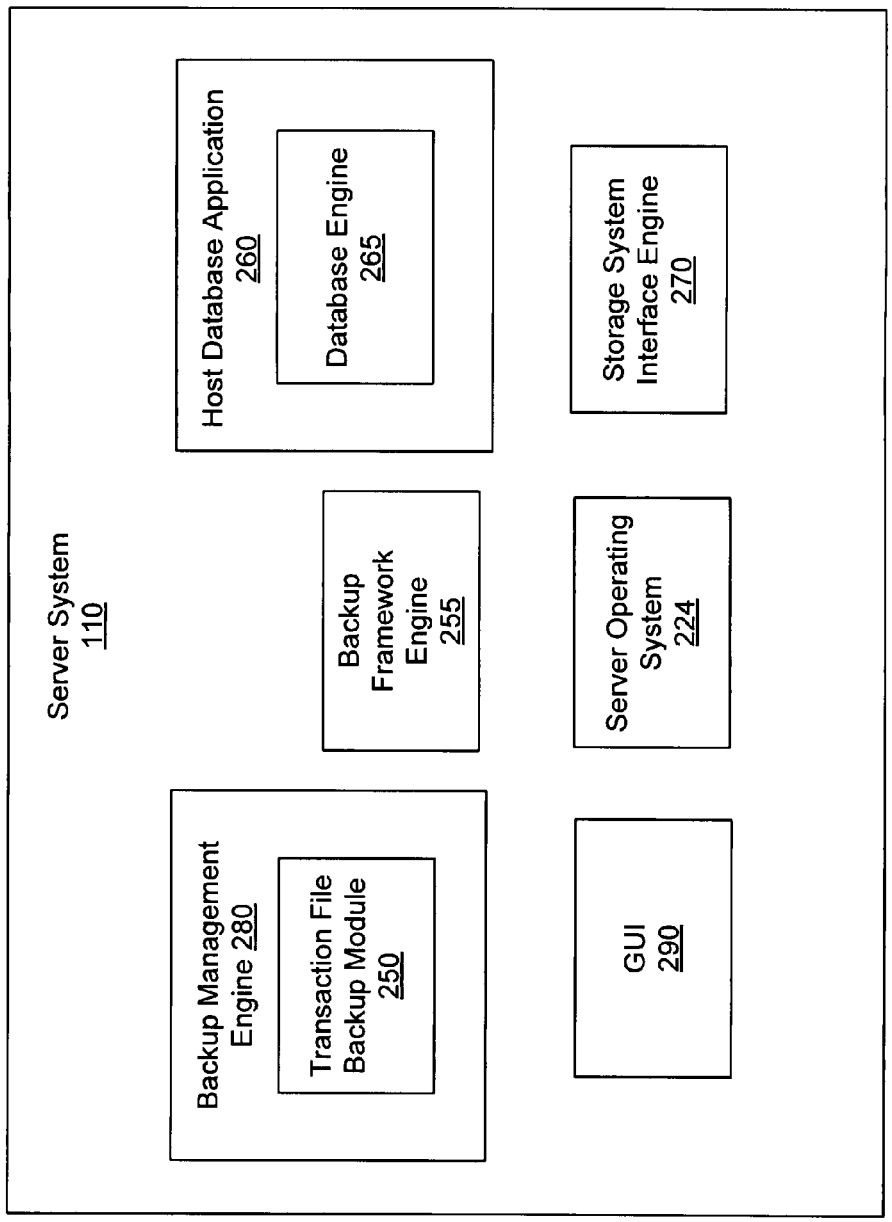
FIG. 2B shows a conceptual diagram of exemplary application and data components that may be employed in the server system of FIG. 2A.

FIG. 2B shows a conceptual diagram of exemplary application and data components that may be employed in the server system 110 of FIG. 2A. In some embodiments, the server system 110 executes the following software: a host database application(s) 260 (having a database engine 265), a backup management engine 280 (having a transaction file backup module 250), a user interface engine 290, a storage system interface engine 270, a backup framework engine 255, and a server operating system 224. Server operating system 224 is a program that is, after being initially loaded into server memory 228, manages host database applications executed on server system 110. The server operating system 224 can be, for example, UNIX®, Windows NT®, Linux®, or any other general-purpose operating system.

In one embodiment, the various engines are implemented as modules. As used herein, the term "module" refers to computer program code adapted to provide the functionality attributed to the module upon execution by a processor. Host database application(s) 260 can be, for example, Microsoft Exchange Server, although the present invention contemplates that other host database applications can be executed at server system 110. In the case of Microsoft Exchange Server, electronic messages (emails) are received from clients 140 and are passed to the database (DB) engine 265. DB Engine 265, in turn, processes the emails and stores them on disks 194 as files.

In Microsoft Exchange Server, a storage group (discussed above in relation to FIG. 1) is used as a unit for storing data. Each storage group may include a set of database files and a set of transaction files. Backup management engine 280 causes the storage system 120 to backup database files of storage groups using, for example, snapshot capability. The process of creating snapshots is described in U.S. patent application Ser. No. 10/090,963, entitled "System and Method for Creating a Point-in-time Restoration of Database File," by Dennis Chapman, the contents of which are incorporated by reference herein. In some embodiments, the transaction file backup module 250 of the backup management engine 280 causes the storage system 120 to backup transaction files of storage groups using a copy-less archiving method described herein. As used herein, a full backup of a storage group comprises a backup of the set of database files of the storage group (e.g., using snapshot technology) and a backup of the set of transaction files of the storage group.

For each full backup of a storage group, the backup management engine 280 also causes storage system 120 to create a set of one or more backup metadata files that are stored to the storage system 120. A backup metadata file may include information about a particular backup of a storage group. This information may include, for example, an identification of the storage group, a time stamp when the particular backup was performed, and filenames of archived database and transaction files and their volume and directory locations on disk(s) 194 (i.e., the directory path where the filenames for archive database files are held and the directory path where the archive transaction filenames are held). A backup metadata file may also include information regarding which particular transaction files that have or have not already been integrated into the database files. In some embodiments, a set of archive database filenames, set of archive database files, set of archive transaction filenames, and backup metadata files produced by a full backup of a storage group comprises a "backup dataset" for the storage group. The backup dataset for a storage group may be used later to restore the storage group (in case of a system crash, data corruption, virus, etc.).

Full backups of selected storage groups may be performed on a regular schedule (e.g., every 2 days) or may be invoked by a system administrator (e.g., by submitting a backup request via a user interface provided by the GUI engine 290). In some embodiments, a full backup of a storage group may be performed using the backup management engine 280 which comprises SnapManager® program for Microsoft® Exchange for Windows, a program provided by Network Appliance, Inc., of Sunnyvale, Calif. Storage system interface engine 270 is configured to act as an interface between server system 110 and storage system 120. Storage system interface engine 270 communicates with storage system 120 using, for example, Zephyr Application and Programming Interface (ZAPI) protocol. In particular, the storage system interface engine 270 interacts with the backup management engine 280 to receive and perform requests made by the backup management engine 280 by interacting with other software programs of the server system 110 or storage system 120. In some embodiments, storage system interface engine 270 comprises SnapDrive® program for Windows, a program provided by Network Appliance, Inc., of Sunnyvale, Calif. In some embodiments, a backup framework engine 255 may also be used to help implement a full backup of one or more storage groups. The backup framework engine 255 may be used to help integrate the various backup components of the host database application 260, backup management engine 280, and the storage system interface engine 270 and interacts with these various components to produce a full backup of a storage group. In some embodiments, the backup framework engine 255 comprises Volume Shadow Copy Service (VSS), a software product provided by Microsoft Corp.

As will be described herein in reference to FIG. 3, after backup management engine 280 initiates a full backup of a designated storage group (e.g., by sending a command to storage system 120 via storage system user interface engine 270 and backup framework engine 255), storage operating system 330 of storage system 120 (shown in FIG. 3) archives the database files, archives the transaction files (e.g., using a copy-less archive method), and creates backup metadata files describing the full backup. After the full backup is performed, the storage operating system 330 sends a signal to backup management engine 280 that the full backup operation is completed. In some embodiments, as part of the backup process, a truncation process is then performed to remove unneeded original transaction filenames of original transaction files that already have been integrated into the database files. In some embodiments, a restore operation is later performed using the backup dataset of the storage group.

Storage System

Figure 3:
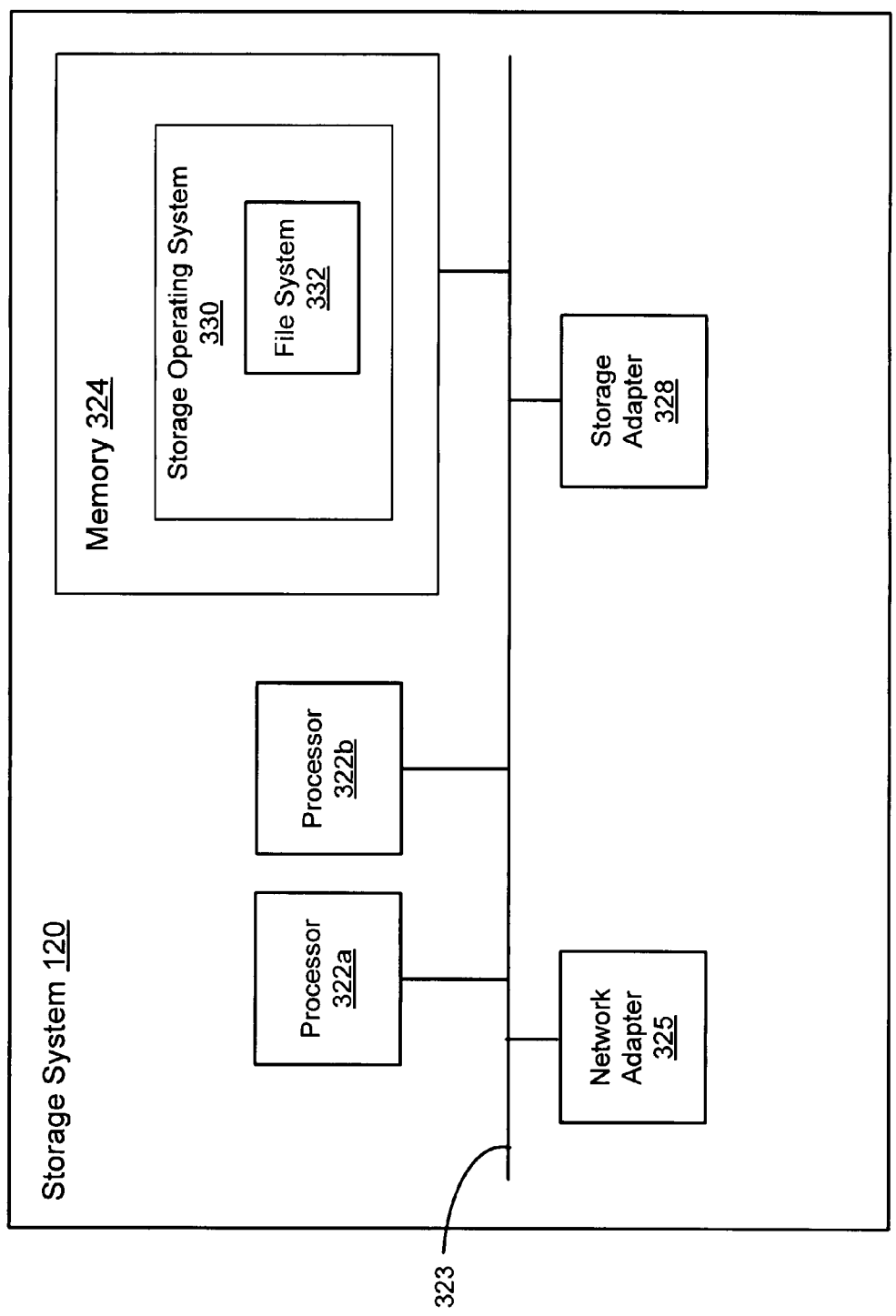
FIG. 3 is a diagram illustrating various components of the storage system, in accordance with some embodiments.

FIG. 3 is a diagram illustrating various components of the storage system 120, in accordance with some embodiments. Specifically, the storage system comprises a plurality of processors 322*a, b*, a memory 324, a network adapter 325, and a storage adapter 328 interconnected by a system bus 323. The storage system 120 executes a storage operating system 330 that implements a file system 332.

The memory 324 comprises storage locations that are addressable by the processors and adapters for storing software program code and data structures. The processor and adapters may, in turn, comprise processing elements and/or logic circuitry configured to execute the software code and manipulate various data structures. The network adapter 325 comprises a plurality of ports adapted to couple storage system 120 to one or more server systems 110 over point-to-point links, wide area networks, virtual private networks implemented over a public network (Internet) or a shared local area network. The network adapter 325 thus may comprise the mechanical, electrical and signaling circuitry. The storage adapter 328 cooperates with the storage operating system 300 to access information requested by server system 110. The storage adapter 328 comprises a plurality of ports having input/output (I/O) interface circuitry that couples to the disks over an I/O interconnect arrangement, such as a conventional high-performance, FC link topology.

The storage operating system 330, portions of which are typically resident in memory 324 and executed by the processing elements, functionally organizes the storage system 120 by, inter alia, invoking storage operations in support of the storage service implemented by the storage system 120. It will be apparent to those skilled in the art that other processing and memory means, including various computer readable media, may be used for storing and executing program instructions pertaining to the invention described herein. As illustrated herein, storage operating system 330 may comprise the NetApp® Data ONTAP® operating system available from Network Appliance Inc., of Sunnyvale, Calif., that implements a Write Anywhere File Layout (WAFL™) file system. However, it is expressly contemplated that any appropriate file system may be enhanced for use in accordance with the inventive principles described herein to facilitate access to disks. As such, where the term "WAFL" is employed, it should be taken broadly to refer to any file system that is otherwise adaptable to the teachings of this invention. As used herein, the term "storage operating system" generally refers to the computer-executable code operable on a computer that manages data access.

The storage operating system 330 may implement a file system 332 for a storage volume on a disk 194. A file system may provide multiple directories in a single storage volume, each directory containing zero or more filenames. A file system provides a logical/virtual representation of how data (files) are organized on a volume, where data (files) are represented as filenames that are organized in one or more directories. As used herein, the term "file" indicates a container, an object, or any other storage entity that contains a group of related data. A database system comprising a set of database files and a set of transaction files is described herein for illustrative purposes only. In other embodiments, the copy-less archive and restore processes may be used for any other type of file or data container. As such, the embodiments described herein should not be construed as being restricted to only database systems and database files. As used herein, the term "filename" or "hardlink" indicates a pointer that points to or references a particular file. A filename/hardlink for a file typically contains the physical address (location) of the file as stored on disk 194.

As known in the art, when the file system creates a file, it also automatically creates one filename for the file and stores the filename in a designated directory. New/additional filenames to a file can be created so that more than one filename is associated with the same file. New/additional filenames to a file can be created using a file system call (such as the fsutil utility in NTFS or the link( )system call for the UNIX® file system). In some files systems (such as NTFS), a filename can only refer to a file that is stored on the same volume and file system as the filename (i.e., the filename and the file it refers to should be on the same volume). For such file systems, the archive directory should be designated on the same volume as the original transaction files so that archive filenames referencing the original transaction files can be created in the archive directory.

In some embodiments, the database files of a storage group contain email information that has been received and fully processed by the host database application and organized and stored in a particular format. In contrast, transaction files contain email information that has been received by the host database application but has not been fully processed and stored in the same manner or format as the database files. Typically, transaction files contain information regarding relatively recent email transactions/events (such as modifications, deletions, or additions of emails) that may or may not be currently reflected in the database files (i.e., "integrated" into the database files). Typically, the information contained in the transaction files are integrated into the database files according to a predetermined schedule (i.e., the information contained in the transaction files are organized and formatted into the database files). The email transactions/events logged in the transaction files typically comprise client events that would require writing data to the database (such as forwarding, sending, or deleting emails) and typically do not include client events that would not require writing data to the database (such as reading an email).

New email information/events are continually received by the host database application and then written to a current transaction file until the current transaction file is filled. The size of each transaction file is typically fixed to a set predetermined maximum size (e.g., 5 MB). When enough information/events are logged to a current transaction file to reach the maximum size, a next transaction file is then created and written to. This results in a series of transaction files, each file being of a fixed byte size (except for the current transaction file being written to). The transaction files are typically given filenames that reflect the chronological order in which they were written to in relation to other transaction files. For example, a set of transaction files for a storage group may be given filenames "transactionfile1," "transactionfile2," "transactionfile3," "transactionfile4," etc., whereby "transactionfile1" is created before "transactionfile2." Information contained in the transaction files for a storage group are typically integrated into the database files of the storage group in chronological order as well (e.g., where "transactionfile1" is integrated into the database files before "transactionfile2").

Copy-Less Archiving

The host database application 260 creates and stores database and transaction files to designated directories of particular volumes of the storage system. As referred to herein, the host database application 260 creates and stores "original" database and transaction filenames to "original" database and transaction directories, respectively, the "original" filenames referring to "original" files that are to be archived/backed up. Also, as referred to herein, the host database application stores "archive" database and transaction filenames to "archive" database and transaction directories, respectively.

FIG. 4A shows a conceptual diagram of exemplary database, transaction, and backup metadata files that are produced by a full backup and stored to original and archive directories on a disk 194. As shown in FIG. 4A, original database filenames are stored in an original database directory, archive database filenames are stored in an archive database directory (e.g., within snapshot), original transaction filenames are stored in an original transaction directory, and archive transaction filenames are stored in an archive transaction directory.

Figure 4B:
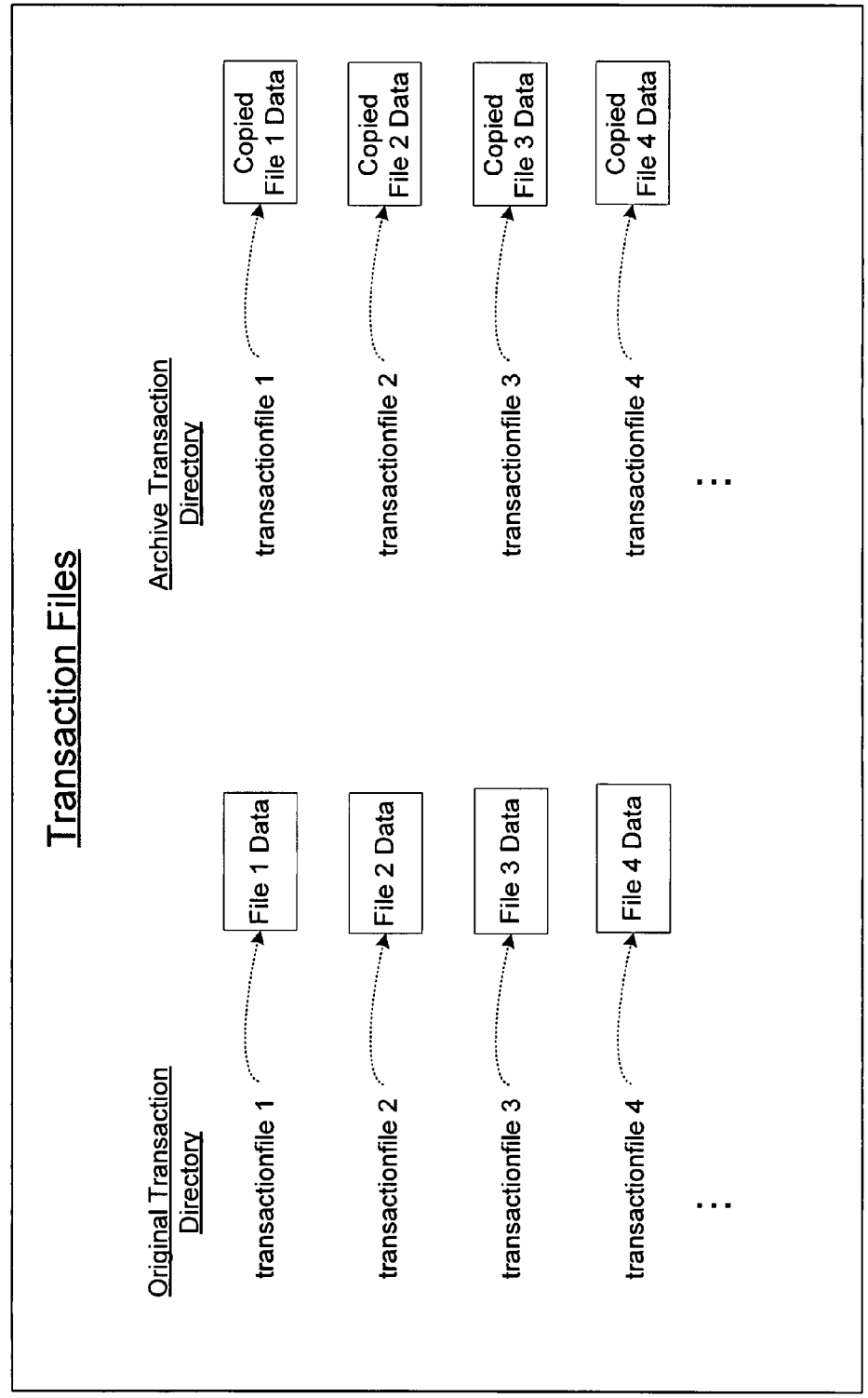
FIG. 4B shows a conceptual illustration of the end result of a conventional backup method that copies transaction files.

As discussed above, a filename refers/points to a file, whereby the actual file is typically stored in the same volume of the storage system as the volume containing the particular directory and filename. FIG. 4B shows a conceptual example of the relationship between filenames in a directory and the files to which the filenames refer. As shown in the example of FIG. 4B, the file system may create and store a particular original transaction filename in the original directory of a volume of the storage system, and store the original transaction file (that the particular original transaction filename points to) elsewhere in the volume.

Conventionally, a backup of the original transaction files includes the copying of all original transaction files and storing filenames to copied transaction files in an archive directory. As such, the end result of a conventional backup of transaction files is a set of original filenames in the original directory, a set of original transaction files, a set of archive filenames in an archive directory, and a set of archive transaction files stored on the disks 194. FIG. 4B shows a conceptual illustration of a conventional backup method that copies original transaction files. As shown in the example of FIG. 4B, a copy of each transaction file (archive file) is created as well as a filename (archive filename) for the copied transaction file, the archive filename being stored in the archive directory.

In some embodiments, the transaction file backup module 250 of the backup management engine 280 backs up original transaction files by creating new filenames (archive filenames) to the original transaction files in an archive directory. In these embodiments, new archive filenames/hardlinks to the original transaction files are created rather than creating copies of the original transaction files. The transaction file backup module 250 may create a new filename to an original transaction file by calling, for example, a "CreateHardLink" Application Programming Interface (API) and specifying the name of the new filename, the address location of the original transaction file that the new filename refers to, and the directory path to the designated archive directory where the new filename is to be stored. The "CreateHardLink" API may be used to communicate with the file system which then creates the new filename as specified using a file system call (such as the fsutil utility in NTFS).

Figure 4C:
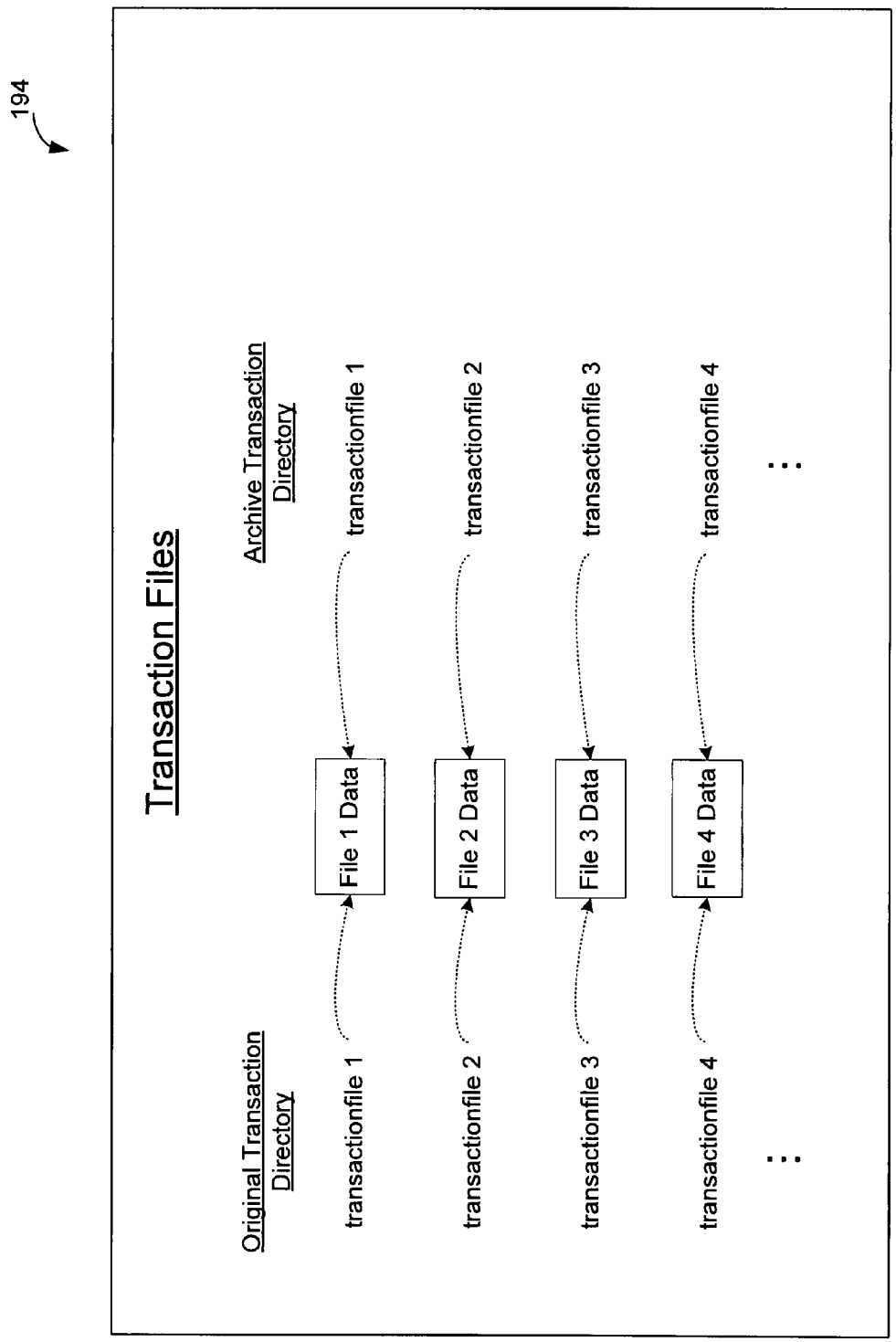
FIG. 4C shows a conceptual illustration of the end result of the copy-less archive method that does not copy transaction files.

FIG. 4C shows a conceptual illustration of the end result of the copy-less archive method as performed on the transaction files of FIG. 4A. As shown in the example of FIG. 4C, the result of the copy-less archive is a set of original transaction filenames in an original directory, a set of original transaction files, and a set of archive transaction filenames in an archive directory, whereby each archive transaction filename points to a particular original transaction file.

Truncation Process

Conventionally, as part of the backup of the transaction files, the host database application 260 may then truncate (delete) unneeded original transaction files in the original directory. The unneeded original transaction files comprise transaction files that have already been integrated into the database files. The database engine 265 of the host database application 260 typically integrates information in the transaction files on a regular schedule and keeps track of the particular transaction files that have been integrated into the database files. The transaction files are typically integrated sequentially according to chronological order (where the earliest created transaction file will be integrated first). For example, "transactionfile1" would be integrated into the database files first, then "transactionfile2," "transactionfile3," etc. As such, the database engine 265 may simply keep track of the last transaction file that was integrated into the database files, whereby it may be assumed that any previous transaction files have been integrated as well.

After the backup management engine 280 performs a full backup of the original transaction files, the backup management engine 280 sends a signal to the host database application indicating that a full backup has been successfully completed. Conventionally, upon receiving the signal, the host database application then performs a truncation process that deletes original transaction filenames in the original directory that refer to integrated original transaction files. As used herein, an integrated/unneeded transaction filename points to an integrated/unneeded transaction file, whereas a non-integrated/needed transaction filename points to a non-integrated/needed transaction file.

As well known in the art, deletion of a filename to a file in a volume requires a number of steps by the file system of the volume which may or may not cause the file itself to be deleted. Each file in a volume has an associated link counter (provided by the file system) that indicates the number of filenames/hardlinks that point to the file. When a new filename/hardlink is created for a file, the file system increments the link counter, and when a filename/hardlink is deleted for a file, the file system decrements the link counter. When a filename in a particular directory that points to a particular file is requested to be deleted (e.g., by the host database application), the file system checks the link counter associated with the particular file. If the associated link counter is 1, this means the filename requested to be deleted is the only filename that points to the particular file and the file system then deletes the filename in the particular directory as well as the particular file that it points to. If the associated link counter is greater than 1, this means the filename requested to be deleted is not the only filename that points to the particular file and the file system then deletes only the filename in the particular directory but not the particular file (and also decrements the link counter for the particular file).

As such, a request by the host data application for deletion of an integrated original transaction filename that points to an integrated transaction file will cause the file system to check the link counter associated with the integrated original transaction file. Conventionally, the link counter associated with the integrated original transaction file will equal 1 (since new additional filenames to the transaction files are not created in the conventional archive method). As such, the file system will delete the integrated original transaction filename from the original directory as well as the integrated original transaction file.

In the copy-less archive method, the truncation process may still be performed by the host database application in the same manner. During the truncation process, the host database application stills requests deletion of the integrated original transaction filenames from the original directory, whereby the integrated original transaction filenames are then deleted by the file system without causing a file system error. However, the integrated original transaction file will not be deleted since the link counter associated with the integrated original transaction file will be greater than 1 (since an additional archive filename was created for the integrated original transaction file). As such, the file system will delete the integrated original transaction filename from the original directory but will not delete the integrated original transaction file.

Figure 5:
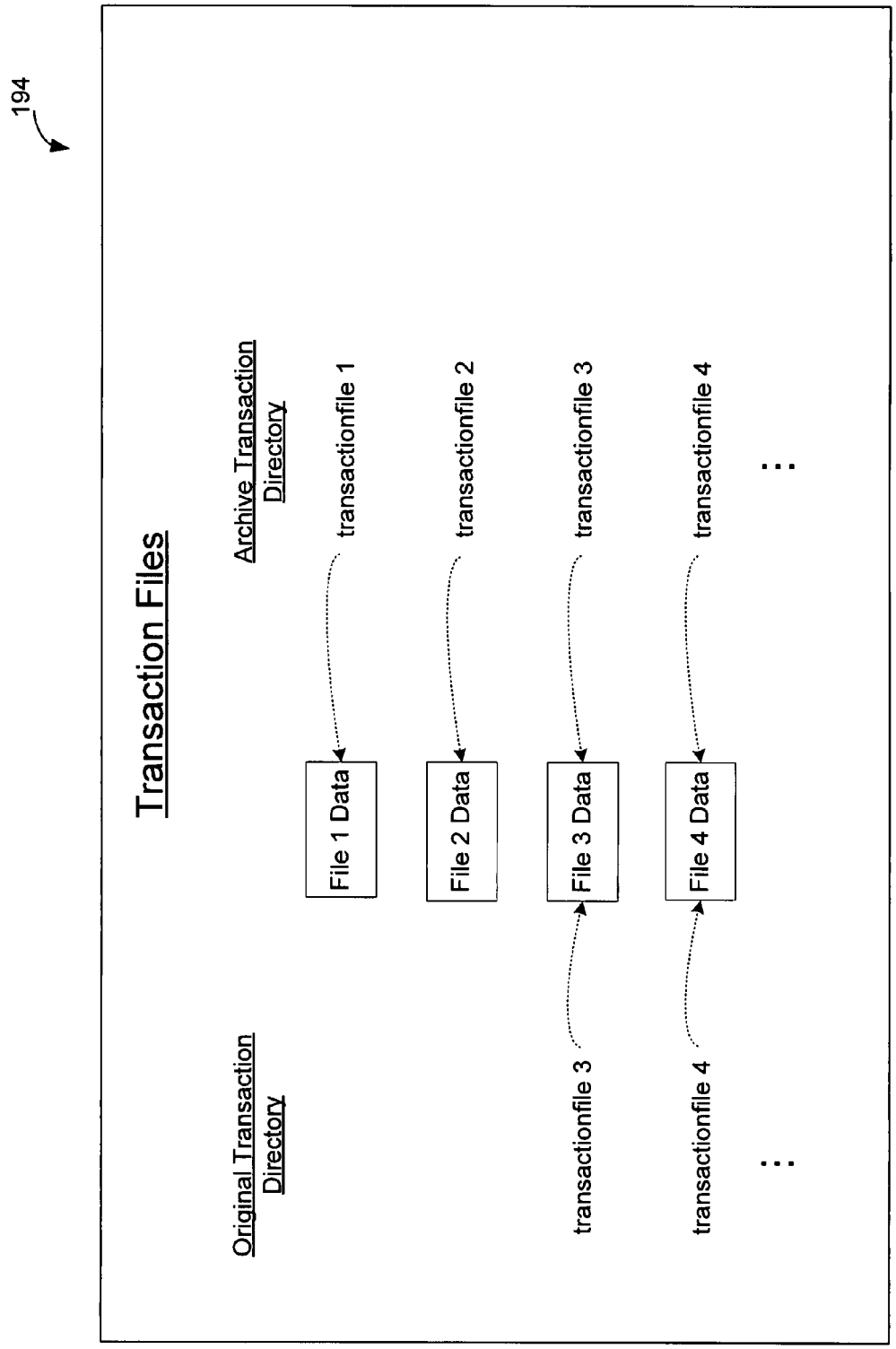
FIG. 5 shows a conceptual illustration of a truncation process.

FIG. 5 shows a conceptual illustration of a truncation process performed by the host database application. In the example of FIG. 5, the original transaction files with filenames "transactionfile1" and "transactionfile2" are integrated original transaction files that the host data application marked for deletion/truncation, whereas "transactionfile3" and "transactionfile4" are non-integrated original transaction files that are not marked for deletion/truncation. For example, upon sending a request to the file system for deleting filename "transactionfile1" from the original directory, the file system will check the link counter for the original transaction file (indicated as "File 1 Data") referenced by the filename and see that the link counter is greater than 1. As such, the file system will delete the filename "transactionfile1" from the original directory but will not delete the original transaction file (since the archive filename "transactionfile1" in the archive directory still points to this original transaction file).

As shown above, the copy-less archive method allows the truncation process of the host database application to be performed without requiring modification of the host database application. The host database application truncates unneeded original transaction filenames in the original directory, as per usual. As such, the host database application requires no knowledge of the copy-less archive method whereby new/additional filenames were created for the transaction files.

During the truncation process, since each original transaction file will have two filenames (the original and archive filenames), the file system will not delete the original transaction file. As such, the truncation process will produce a set of non-integrated original filenames in the original directory, a set of all (integrated and non-integrated) original transaction files, and a set of all (integrated and non-integrated) archive filenames in the archive directory. In some embodiments, the set of archive filenames in the archive directory are used to perform a restore of the transaction files, as discussed further below. After the restore process, the host database application may use restored original transaction filenames, for example, to locate the original transaction files to recover database files by integrating information from the original transaction files.

Figure 6:
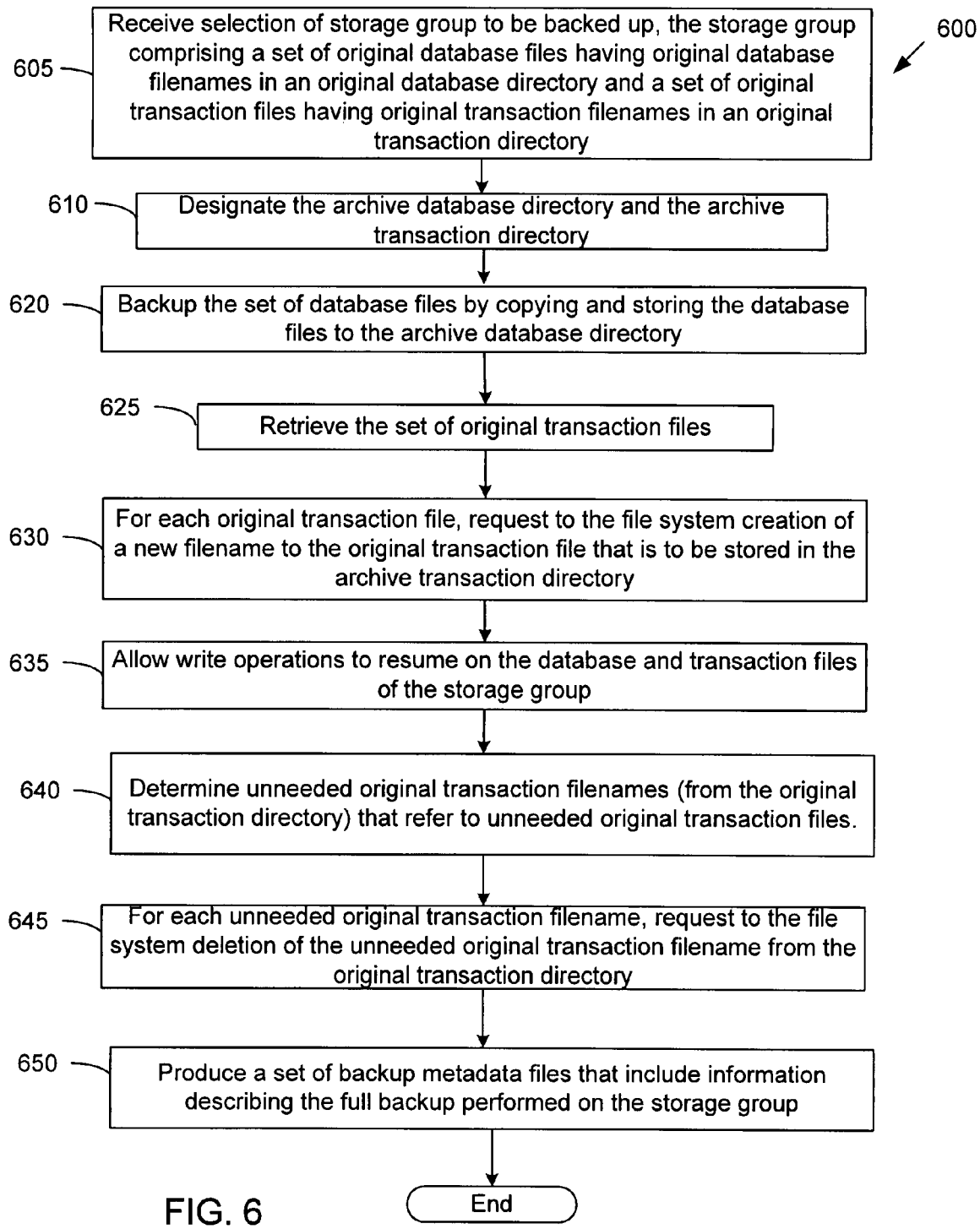
FIG. 6 is a flowchart of a method for a copy-less transaction file archiving process for a storage group.

FIG. 6 is a flowchart of a method 600 for an archiving process for a storage group, the archiving process including a truncation process. In some embodiments, the method 600 is implemented by software or hardware configured to archive the storage group. In some embodiments, the steps of method 600 are performed by various software components executing on the server system 110. For example, in some embodiments, the backup management engine 280 (comprising the transaction file backup module 250) backs up/archives the storage group through use of the user interface engine 290 and/or backup framework engine 255 and the host database application 260 performs the truncation process. The various software components executing on the server system 110 interact with the storage system 120 that stores database and transaction files of the storage group on one or more volumes of a set of disks 194. The storage system 120 implements one or more file systems that provide a logical representation of files as organized on one or more volumes and as represented as filenames in one or more directories. The order and number of steps of the method 600 are for illustrative purposes only and, in other embodiments, a different order and/or number of steps are used.

The method 600 begins when it receives (at 605) a selection of storage group to be backed up (e.g., as selected by the host database application 260 according to a predetermined schedule or by a system administrator). The storage group comprises a set of original database files having original database filenames in an original database directory and a set of original transaction files having original transaction filenames in an original transaction directory on the storage system 120. At this point, each original transaction file has an associated link counter equal to one since only one filename refers to the original transaction file.

The method then designates (at 610) an archive directory for the storage group where the results of the storage group backup are to be stored. The method may do so by designating volume and directory paths for an archive database directory and an archive transaction directory. In some embodiments, the method designates (at 610) the archive transaction directory to be in the same volume in the storage system 120 as the volume containing the set of original transaction files. The method backs up (at 620) the set of database files of the storage group by copying and storing the database files. The method may do so by taking a snapshot copy (a persistent point in time image) of the database files and storing the snapshot copy to the archive database directory.

The method then retrieves (at 625) the set of original transaction files. For each original transaction file in the set, the method requests to the file system (at 630) creation of a new filename (archive transaction filename) to the original transaction file that is to be stored in the archive transaction directory. The method may do so, for example, by calling a "CreateHardLink" API and specifying the name of the new filename, the address location of the original transaction file that the new filename refers to, and the directory path to the designated archive directory where the new filename is to be stored. The "CreateHardLink" API may be used to communicate with the file system which then creates the new archive transaction filename as specified using a file system call (such as the fsutil utility in NTFS). Note that the file system would also increment the link counter associated with each original transaction file as a new filename is created for each original transaction file.

A full backup of the database and transaction files is performed in steps 605 to 630 that produces a set of archive database files having archive database filenames in an archive database directory and a set of original transaction files having archive transaction filenames in an archive transaction directory. At this point, each original transaction file has an associated link counter equal to two since original and archive transaction filenames refer to each original transaction file. After the full backup is performed, the method then allows (at 635) write operations to resume on the database and transaction files of the storage group. The method then performs a truncation process (in steps 640 to 645), to delete integrated/unneeded original transaction filenames (from the original transaction directory) that refer to integrated/unneeded original transaction files.

The method determines (at 640) a set of unneeded original transaction filenames that refer to a set of unneeded original transaction files. As discussed above, the host database application keeps track of the particular transaction files that have already been integrated in the database files, these files comprising the set of unneeded original transaction files. For each unneeded original transaction filename in the set, the method requests to the file system (at 645) deletion of the unneeded original transaction filename from the original transaction directory. In response, the file system will check and determine that the link counter associated with the unneeded original transaction file is greater than 1. Thus the file system will decrement the link counter and delete the unneeded original transaction filename in the original transaction directory but will not delete the unneeded original transaction file. As such, the truncation process does not delete any of the original transaction files or any of the archive transaction filenames, which may be used later during a restore process.

In some embodiments, the method then produces (at 650) a set of backup metadata files that are stored to the storage system. The set of backup metadata files include information describing the full backup performed on the storage group (e.g., a time stamp when the particular full backup was performed, filenames and directory locations of archived database and transaction files, etc.). The set of archive database filenames, set of archive database files, set of archive transaction filenames, and backup metadata files produced by the full backup of the storage group comprises a "backup dataset" for the storage group that may be used later to restore the storage group. The method then ends.

Restore Process

In some embodiments, the backup dataset of a storage group is used by the backup management engine 280 to perform a restore of the storage group. A restore of a storage group may be performed for a variety of reasons. For example, a restore may be performed when an error in the host database application, server or storage operating system, or the other applications occur causing a "crash" and reboot of the server system or storage system. A restore may be performed when data in the storage group have been altered (e.g., corrupted or deleted), for example, by a computer virus or other malignant code. Conventionally, if an original transaction file has become altered (e.g., corrupted or deleted), it is restored by copying its corresponding archive transaction file and replacing the original transaction file with the copied archive transaction file. Copying archive files and replacing original files with copied archive files, however, requires significant disk space consumption of the storage system as well as increasing server system and storage subsystem workload.

Figure 7A:
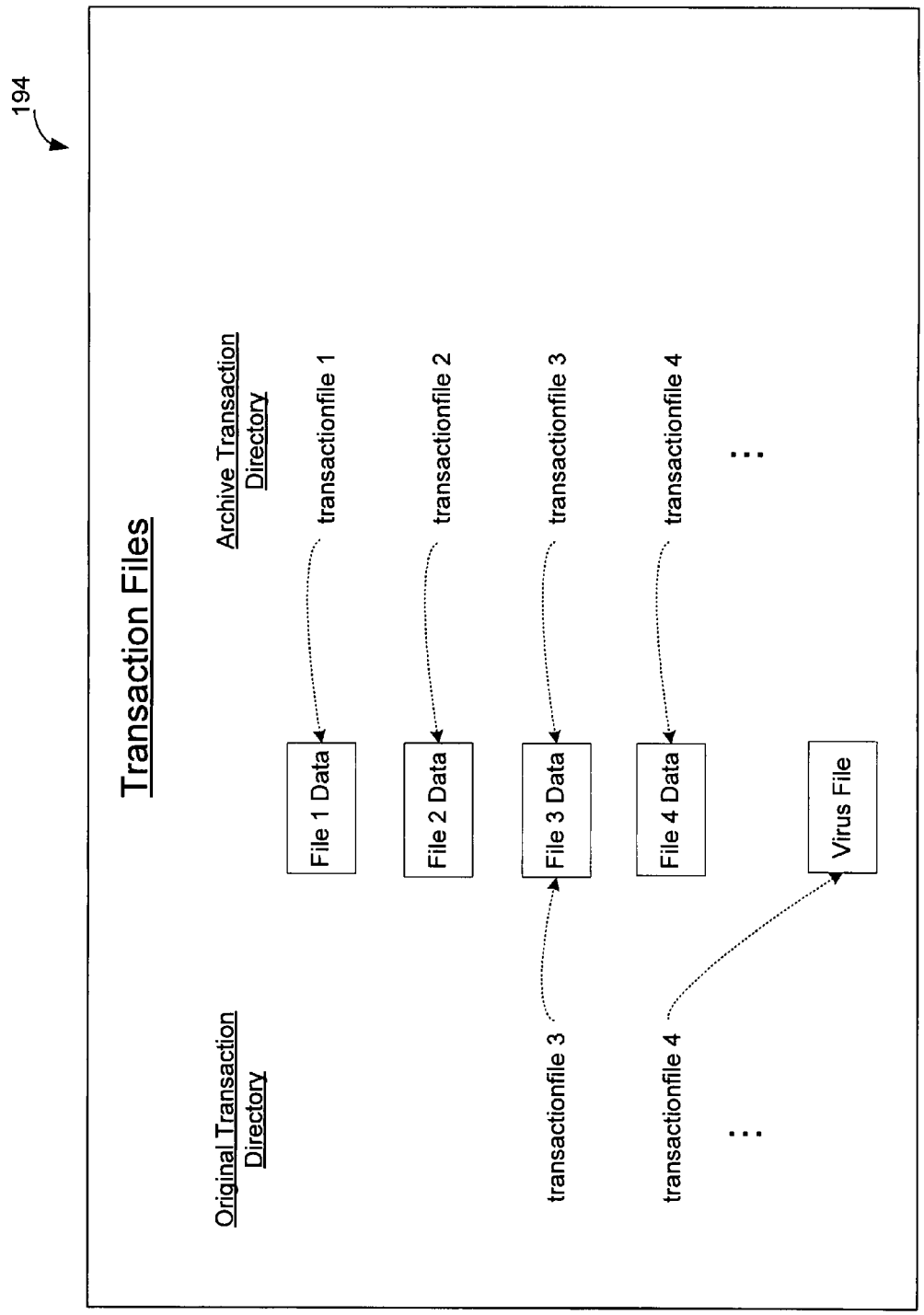
FIG. 7A shows a conceptual example of the results of a computer virus that has created a virus file.

In some embodiments, the archive transaction filenames (produced by the "copy-less" archive process) are later used by the backup management engine to perform a "copy-less" restore of the database system. In these embodiments, the archive transaction filenames in the archive directory may be used to restore original transaction filenames in the original directory that may have become altered (e.g., corrupted or deleted). In these situations, an original transaction filename in the original directory may have become deleted or corrupt where a virus has created a new file (virus file) and reconfigured the original transaction filename to point to the virus file (rather than pointing to the original transaction file as it initially did). FIG. 7A shows a conceptual example of the results of a computer virus that has created a new file (indicated as "Virus File") and has reconfigured original transaction filename "transactionfile 4" in the original directory to point to the new file (rather than pointing to "File 4 Data" as it initially did).

In some embodiments, as part of a restore process, the backup management engine 280 uses the archive transaction filenames in the archive directory to restore original transaction filenames in the original directory that may have become altered (e.g., corrupted or deleted). In these embodiments, the backup management engine 280 may determine whether each original transaction filename has been corrupted to point to a virus file rather than the original transaction file as it should. If so, the virus file and the corrupted original transaction filename in the original directory are deleted. The archive transaction filename (in the archive directory) corresponding to the corrupted original filename is then copied and stored to the original directory (where the corresponding archive transaction filename points to the original transaction file). Alternatively, instead of copying the archive transaction filename, a new transaction filename that points to the original transaction file may be created in the original directory. The backup management engine 280 may also determine whether an original transaction filename has been deleted. If so, the archive transaction filename corresponding to the corrupted original filename is then copied and stored to the original directory or a new transaction filename that points to the original transaction file is created in the original directory.

Figure 7B:
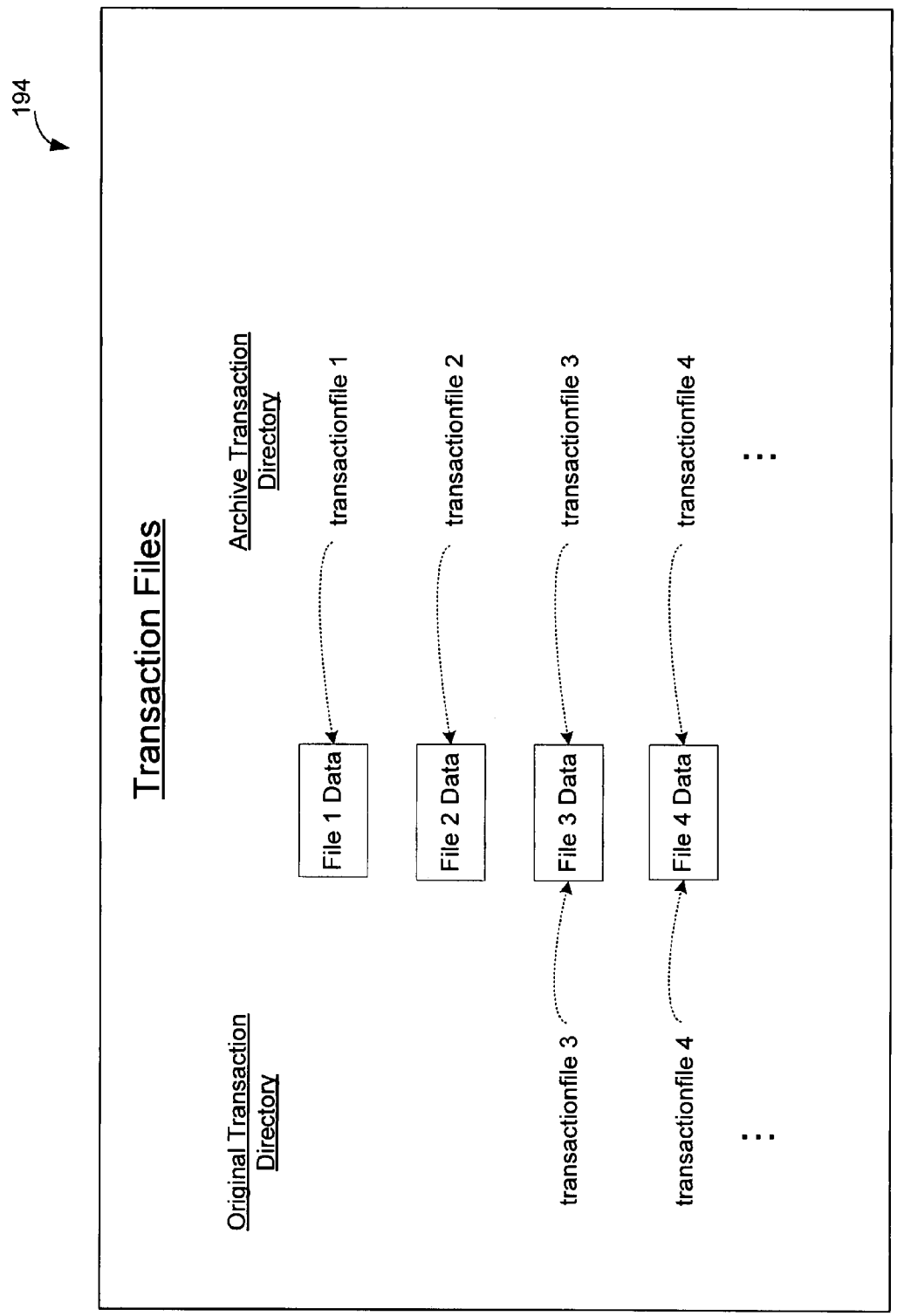
FIG. 7B shows a conceptual example of the results of a restore process on the transaction files of FIG. 7A.

FIG. 7B shows a conceptual example of the results of a restore process on the transaction files of FIG. 7A. In the example of FIG. 7B, the corrupted filename "transactionfile 4" in the original directory has been deleted as well as the virus file that it points to. The corresponding archive filename "transactionfile 4" (in the archive directory) is then copied and stored to the original directory, the archive filename "transactionfile 4" pointing to "File 4 Data" as it should. Alternatively, a new filename "transactionfile 4" that points to "File 4 Data" may be created in the original directory.

Figure 8A:
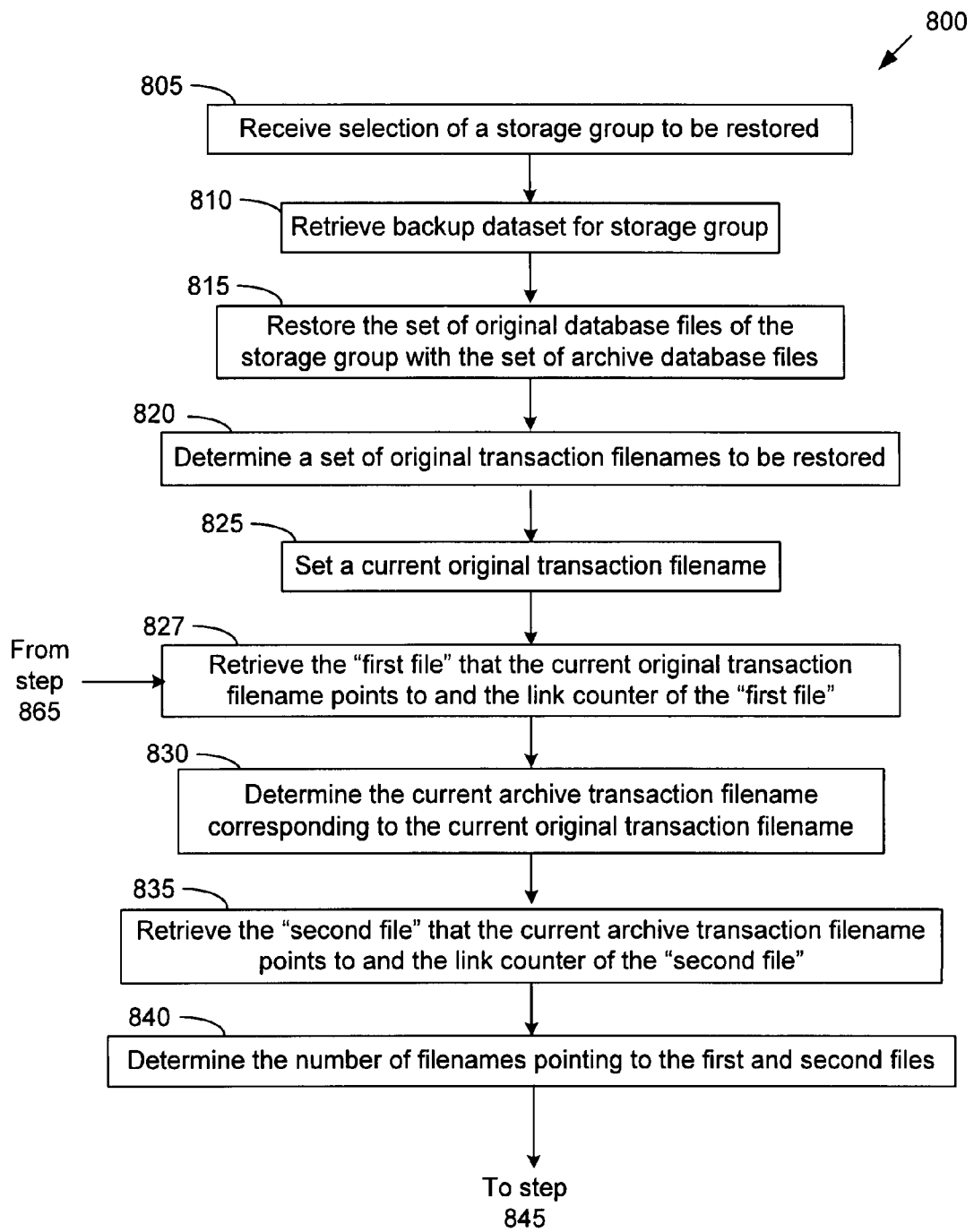
FIGS. 8A-B are flowcharts of a method for a restore process for a storage group.
Figure 8B:
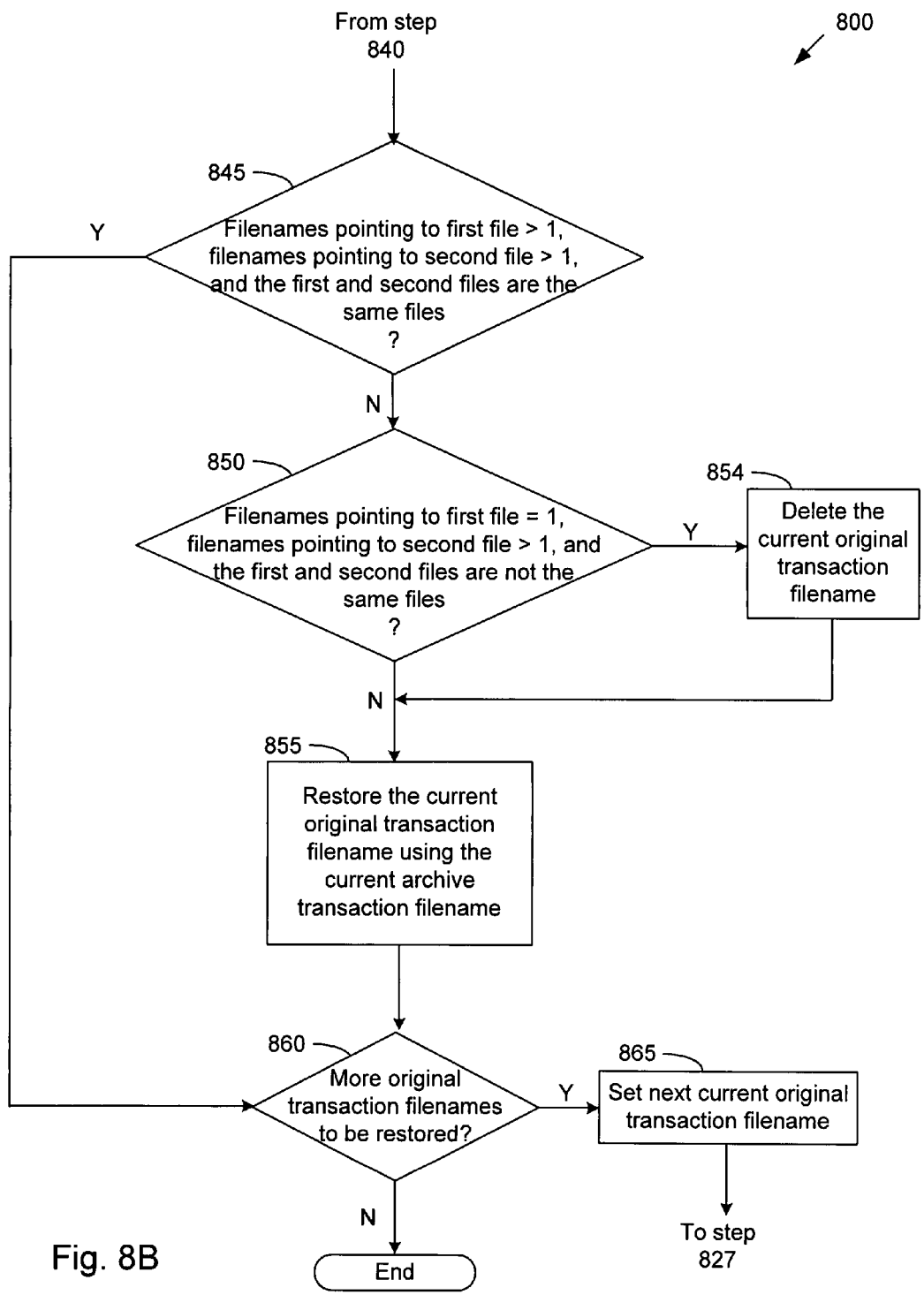

FIGS. 8A-B are flowcharts of a method 800 for a restore process for a storage group. In some embodiments, the method 800 is implemented by software or hardware configured to restore the storage group. In some embodiments, the steps of method 800 are performed by various software components executing on the server system 110. For example, in some embodiments, the backup management engine 280 restores the storage group through use of the storage system interface engine 270 and/or backup framework engine 255. The various software components executing on the server system 110 interact with the storage system 120 that stores original database and transaction files and a backup dataset of the storage group on one or more volumes of a set of disks 194. The storage system 120 implements one or more file systems that provide a logical representation of files as organized on one or more volumes and as represented as filenames in one or more directories. The order and number of steps of the method 800 are for illustrative purposes only and, in other embodiments, a different order and/or number of steps are used.

The method 800 begins when it receives (at 805) a selection of a storage group to be restored (e.g., as selected by a system administrator after a "crash" and reboot of the server or storage system or when data in the storage group may have become corrupted). The storage group comprises a set of original database files having original database filenames in an original database directory and a set of original transaction files having original transaction filenames in an original transaction directory on the storage system 120.

The method then retrieves (at 810) the backup dataset for the storage group, the backup dataset comprising a set of archive database files having archive database filenames in an archive database directory, a set of original transaction files having archive transaction filenames in an archive transaction directory, and a set of backup metadata files. The method then restores (at 815) the set of original database files of the storage group with the set of archive database files. The method may do so by deleting the set of original database files and replacing them with the set of archive database files. As the data in the set of original database files may have become corrupted, the set of original database files are replaced with the set of archive database files. Or the set of original database files may have been deleted and do not exist and thus are replaced by the set of archive database files.

The method 800 then restores transaction files of the storage group in steps 820 to 865. The method may do so by restoring original transaction filenames in the original transaction directory using the archive transaction filenames in the archive transaction directory. For example, as shown in FIG. 7A, the method 800 may restore filenames "transactionfile 3" and "transactionfile 4" in the original transaction directory using filenames "transactionfile 3" and "transactionfile 4" in the archive transaction directory. The method determines (at 820) a set of original transaction filenames in the original transaction directory to be restored, the set comprising all the original transaction filename in the original transaction directory which have not been integrated into the database files when the full backup was performed (e.g., "transactionfile 3" and "transactionfile 4"). The method then sets (at 825) a first original transaction filename to be restored as a current original transaction filename (e.g., "transactionfile 3").

The method retrieves (at 827) the file (referred to as the "first file") that the current original transaction filename points to as well as a link counter associated with the first file. The method may do so by obtaining the handle of the first file from the file system 332. As known in the art, a handle of a file is a temporary reference assigned by the operating system used to locate and access the file. The handle of a file contains information regarding the file, such as a link counter (that indicates the number of filenames/hardlinks that point to the file), a file index (indicating the file size and physical address location of the file), file volume serial number, etc.

The method then determines (at 830) the archive transaction filename in the archive transaction directory that corresponds to the current original transaction filename (where the corresponding archive transaction filename typically has the same name as the current original transaction filename). For example, as shown in FIG. 7A, the current original transaction filename "transactionfile 3" in the original directory has a corresponding archive transaction filename "transactionfile 3" in the archive directory. The corresponding archive transaction filename is referred to as the current archive transaction filename. The method then retrieves (at 835) the file (referred to as the "second file") that the current archive transaction filename points to as well as a link counter associated with the second file (e.g., by obtaining the handle of the second file from the file system 332). The method determines (at 840) the number of filenames/hardlinks pointing to the first file and the second file (e.g., using the link counters associated with the first and second files).

The method then determines (at 845) whether the number of filenames pointing to the first file is greater than one, the number of filenames pointing to the second file is greater than one, and the first and second files are the same files. The method may determine if the first and second files are the same file by comparing the file indexes of the first and second files (contained in the file handles of the first and second files) that indicate the physical address locations of the first and second files. If the physical address locations of the first and second files match, the method may determine (at 845) that the first and second files are the same file.

If all the conditions are met (at 845—Yes), this indicates that the current original transaction filename and the current archive transaction filename point to the same original transaction file (as it should) and that the current original transaction filename has not become corrupt. For example, as shown in FIG. 7A, current original transaction filename "transactionfile 3" in the original directory and current archive transaction filename "transactionfile 3" in the archive directory both point to the same original transaction file "File 3 Data" (as it should), which has more than one filename pointing to it. As there is no corruption of the current original transaction filename, the current original transaction filename does not need to be restored and the method continues at 860.

If all the conditions are not met (at 845—No), the method determines (at 850) whether the number of filenames pointing to the first file is equal to one, the number of filenames pointing to the second file is greater than one, and the first and second files are not the same files (e.g., by comparing the file indexes of the first and second files). If all the conditions are met (at 850—Yes), this indicates that the current original transaction filename and the current archive transaction filename do not point to the same original transaction file (as it should) and that the current original transaction filename has become corrupt and reconfigured to point to a new file (e.g., as reconfigured by a virus). For example, as shown in FIG. 7A, current original transaction filename "transactionfile 4" in the original directory and current archive transaction filename "transactionfile 4" in the archive directory do not point to the same original transaction file "File 4 Data" (as it should). Rather, original transaction filename "transactionfile 4" has been reconfigured to point to "Virus File." Note that the number of filenames pointing to "Virus File" (first file) is equal to one and the number of filenames pointing to "File 4 Data" (second file) is greater than one (since the link counter associated with "File 4 Data" was incremented to two when the additional archive transaction filename "transactionfile 4" was created in the archive directory during the full backup).

If all the conditions are met (at 850—Yes), this indicates that the current original transaction filename has been corrupted. As such, the method deletes (at 854) the current original transaction filename in the original transaction directory. The method may do so by sending a request to the file system to delete the current original transaction filename, which will also cause deletion of the first file (virus file) that the current original transaction filename points to (since the link counter associated with the first file is equal to one). The method then restores (at 855) the current original transaction filename using the current archive transaction filename. The method may do so by sending a request to the file system to copy the current archive transaction filename to the original directory, the current archive transaction filename referring to the second file. The method may alternatively send a request to the file system to create a new filename in the original directory that refers to the second file. For example, as shown in FIGS. 7A and 7B, the current original transaction filename "transactionfile 4" in the original directory and "Virus File" are deleted. The current archive transaction filename "transactionfile 4" is then copied to the original directory, whereby filename "transactionfile 4" refers to "File 4 Data." Alternatively, a new filename "transactionfile 4" may be created in the original directory that refers to "File 4 Data."

If all the conditions are not met (at 850—No), this indicates that the current original transaction filename has been deleted. As such, the method restores (at 855) the current original transaction filename using the current archive transaction filename (e.g., by copying the current archive transaction filename to the original directory or by creating a new filename in the original directory that refers to the second file). After step 855, the method continues at step 860 where it determines whether there are more original transaction filenames to be restored. If so, the method sets (at 865) the next original transaction filename to be restored as the current original transaction filename and continues at step 827. If not, the method ends.

Note that in the method 800 of FIG. 8, a "copy-less" restore process is performed in that no archive transaction files are actually copied during the process. Rather, original transaction filenames may be replaced by archive transaction filenames if the original transaction filenames have become altered. By doing so, copies of the archive transaction files do not need to be created to replace corresponding original transaction files. This significantly reduces the disk space consumption of the storage system and the server system and storage subsystem workload, while increasing the efficiency and speed of restoring transaction files. By avoiding copying of actual archive transaction files, the method avoids use of the storage subsystem I/O required to copy the files, and reduces disk space consumption on the storage system that would result from file duplication.

Although the present invention for purpose of explanation has been described with reference to specific exemplary embodiments, it will be understood that the invention is not limited to the embodiments described herein. A person of ordinary skill in the art would understand that the present invention can be practiced with modifications and alternations to those embodiments or can be practiced in other embodiments within the spirit and scope of the appended claims.

Moreover, non-dependent acts may be performed in parallel. The embodiments were chosen and described in order to best explain the principles of the invention and its practical applications, to thereby enable others skilled in the art to best utilize the invention and various embodiments with various modifications as are suited to the particular use contemplated.

Furthermore, the use of the phrase "one embodiment" throughout does not necessarily mean the same embodiment. Although these particular embodiments of the invention have been described, the invention should not be limited to these particular embodiments. Accordingly, the specification and drawings are to be regarded in an illustrative sense rather than a restrictive sense.

Moreover, the teachings of this invention can be adapted to a variety of storage system architectures including, but not limited to, a network-attached storage environment and a storage area network. The term "storage system" should therefore be taken broadly to include such arrangements in addition to any subsystems configured to perform a storage function and associated with other equipment or system.

Unless specifically stated otherwise, it is to be appreciated that throughout the discussions utilizing terms such as "processing" or "computing" or "calculating" or "determining" or "displaying" or the like refer to the action and processes of a computer system or similar electronic computing device that manipulates and transforms data represented as physical (e.g. electronic) quantities within the computer systems registers and memories into other data similarly represented as physical quantities within the computer system.

The present invention can be implemented by an apparatus for performing the operations herein. This apparatus may be specially constructed for the required purposes or it may comprise a machine, such as a general-purpose computer selectively activated or reconfigured by a computer program (such as a collection of instructions for execution by a machine or processor for example) stored in the computer. Such a computer program may be stored in a computer readable storage medium, such as, but not limited to any type of disk including floppy disks, optical disks, magnetic optical disks, read-only memories, random access memories, EPROMS, EEPROMS, magnetic or optical cards or any type of media suitable for storing physical (e.g. electronic) constructions and each coupled to a computer system bus. Each of these media may be coupled to a computer system bus through use of an appropriate device for reading and or for writing the media.

What is claimed is:

1. A system for restoring a database system, the system comprising:
  a server system executing a backup management engine and a host database application that implements the database system, the database system comprising a set of one or more transaction data containers stored on a storage system, each transaction data container having an original pointer that references the transaction data container and a corresponding archive pointer that also references the same transaction data container, the original pointer being stored in an original directory and the archive pointer being stored in an archive directory on the storage system, the backup management engine configured for:
    determining whether a first original pointer is altered, wherein the first original pointer initially referenced a first transaction data container, wherein determining whether the first original pointer is altered comprises:
      retrieving a primary transaction data container that the first original pointer currently references and a primary pointer counter associated with the primary transaction data container;
      determining, in the archive directory, a first corresponding archive pointer that corresponds to the first original pointer;
      retrieving a secondary transaction data container that the first corresponding archive pointer currently references and a secondary pointer counter associated with the secondary transaction data container; and
      using the primary and secondary pointer counters and the primary and secondary transaction data containers to determine whether the first original pointer is altered by being deleted from the original directory or by no longer referencing the first transaction data container; and
    upon determining that the first original pointer is altered, restoring the first original pointer in the original directory by replacing, in the original directory, the first original pointer with the first corresponding archive pointer in the archive directory that references the same first transaction data container.

2. The system of claim 1, wherein:
  the database system further comprises a set of database data containers containing client information for a plurality of client computers, the client information in each database data container being organized and stored in a particular format; and
  the set of transaction data containers comprises client information for the plurality of client computers, wherein the client information in each transaction data container is not organized and stored in the particular format of the database data container.

3. A method for restoring a database system, the method comprising:
  implementing the database system on a storage system, the database system comprising a set of one or more transaction data containers stored on the storage system, each transaction data container having an original pointer that references the transaction data container and a corresponding archive pointer that also references the same transaction data container, the original pointer being stored in an original directory and the archive pointer being stored in an archive directory on the storage system;

determining whether a first original pointer is altered, wherein the first original pointer initially referenced a first transaction data container, wherein determining whether the first original pointer is altered comprises:

retrieving a primary transaction data container that the first original pointer currently references and a primary pointer counter associated with the primary transaction data container;

determining, in the archive directory, a first corresponding archive pointer that corresponds to the first original pointer;

retrieving a secondary transaction data container that the first corresponding archive pointer currently references and a secondary pointer counter associated with the secondary transaction data container; and using the primary and secondary pointer counters and the primary and secondary transaction data containers to determine whether the first original pointer is altered by being deleted from the original directory or by no longer referencing the first transaction data container; and upon determining that the first original pointer is altered, restoring the first original pointer in the original directory by replacing, in the original directory, the first original pointer with the first corresponding archive pointer in the archive directory that references the same first transaction data container.

4. The method of claim 3, wherein:

the database system further comprises a set of database data containers containing client information for a plurality of client computers, the client information in each database data container being organized and stored in a particular format; and the set of transaction data containers comprises client information for the plurality of client computers, wherein the client information in each transaction data container is not organized and stored in the particular format of the database data container.

5. A computer-program product comprising a computer readable medium having instructions stored thereon when executed by a processor, restore a database system, the computer-program product comprising sets of instructions for:

implementing the database system on a storage system, the database system comprising a set of one or more transaction data containers stored on the storage system, each transaction data container having an original pointer that references the transaction data container and a corresponding archive pointer that also references the same transaction data container, the original pointer being stored in an original directory and the archive pointer being stored in an archive directory on the storage system;

determining whether a first original pointer is altered, wherein the first original pointer initially referenced a first transaction data container, wherein determining whether the first original pointer is altered comprises:

retrieving a primary transaction data container that the first original pointer currently references and a primary pointer counter associated with the primary transaction data container;

determining, in the archive directory, a first corresponding archive pointer that corresponds to the first original pointer;

retrieving a secondary transaction data container that the first corresponding archive pointer currently references and a secondary pointer counter associated with the secondary transaction data container; and using the primary and secondary pointer counters and the primary and secondary transaction data containers to determine whether the first original pointer is altered by being deleted from the original directory or by no longer referencing the first transaction data container; and upon determining that the first original pointer is altered, restoring the first original pointer in the original directory by replacing, in the original directory, the first original pointer with the first corresponding archive pointer in the archive directory that references the same first transaction data container.

6. The computer-program product of claim 5, wherein:

the database system further comprises a set of database data containers containing client information for a plurality of client computers, the client information in each database data container being organized and stored in a particular format; and the set of transaction data containers comprises client information for the plurality of client computers, wherein the client information in each transaction data container is not organized and stored in the particular format of the database data container.

7. A method for restoring a data container system, the method comprising:

implementing the data container system on a storage system, the data container system comprising a set of one or more data containers stored on the storage system, each data container having an original pointer that references the data container and a corresponding archive pointer that also references the same data container, the original pointer being stored in an original directory and the archive pointer being stored in an archive directory on the storage system;

determining whether a first original pointer is altered, wherein the first original pointer initially referenced a first data container, wherein determining whether the first original pointer is altered comprises:

retrieving a primary data container that the first original pointer currently references and a primary pointer counter associated with the primary data container;

determining, in the archive directory, a first corresponding archive pointer that corresponds to the first original pointer;

retrieving a secondary data container that the first corresponding archive pointer currently references and a secondary pointer counter associated with the secondary data container; and using the primary and secondary pointer counters and the primary and secondary transaction data containers to determine whether the first original pointer is altered by being deleted from the original directory or by no longer referencing the first transaction data container; and upon determining that the first original pointer is altered, restoring the first original pointer in the original directory by replacing, in the original directory, the first original pointer with the first corresponding archive pointer in the archive directory that references the same first transaction data container.

8. A system for restoring a data container system, the system comprising:

a server system executing a backup management engine and a host data container application that implements the data container system, the data container system comprising a set of one or more data containers stored on a storage system, each data container having an original pointer that references the data container and a corresponding archive pointer that also references the same data container, the original pointer being stored in an original directory and the archive pointer being stored in an archive directory on the storage system, the backup management engine configured for:

determining whether a first original pointer is altered, wherein the first original pointer initially referenced a first data container, wherein determining whether the first original pointer is altered comprises:

retrieving a primary data container that the first original pointer currently references and a primary pointer counter associated with the primary data container;

determining, in the archive directory, a first corresponding archive pointer that corresponds to the first original pointer;

retrieving a secondary data container that the first corresponding archive pointer currently references and a secondary pointer counter associated with the secondary data container; and using the primary and secondary pointer counters and the primary and secondary transaction data containers to determine whether the first original pointer is altered by being deleted from the original directory or by no longer referencing the first transaction data container; and upon determining that the first original pointer is altered, restoring the first original pointer in the original directory by replacing, in the original directory, the first original pointer with the first corresponding archive pointer in the archive directory that references the same first transaction data container.

9. The system of claim 1, wherein using the primary and secondary pointer counters and the primary and secondary transaction data containers to determine whether the first original pointer is altered further comprises:

determining a number of pointers that reference the primary transaction data container and a number of pointers that reference the secondary transaction data container using the primary and secondary pointer counters; and determining that the first original pointer is not altered upon determining that the number of pointers that reference the primary transaction data container is greater than one, determining that the number of pointers that reference the secondary transaction data container is greater than one, and determining that the primary and secondary transaction data containers are the same transaction data containers.

10. The system of claim 1, wherein using the primary and secondary pointer counters and the primary and secondary transaction data containers to determine whether the first original pointer is altered further comprises:

determining a number of pointers that reference the primary transaction data container and a number of pointers that reference the secondary transaction data container using the primary and secondary pointer counters;

determining that the first original pointer is altered upon determining that the number of pointers that reference the primary transaction data container is equal to one, determining that the number of pointers that reference the secondary transaction data container is greater than one, and determining that the primary and secondary transaction data containers are not the same transaction data containers;

determining that the first original pointer is altered by no longer referencing the first transaction data container;

deleting the first original pointer from the original directory; and restoring the first original pointer in the original directory by copying the first corresponding archive pointer into the original directory or producing a new pointer in the original directory that references the first transaction data container.

11. The method of claim 3, wherein using the primary and secondary pointer counters and the primary and secondary transaction data containers to determine whether the first original pointer is altered further comprises:

determining a number of pointers that reference the primary transaction data container and a number of pointers that reference the secondary transaction data container using the primary and secondary pointer counters; and determining that the first original pointer is not altered upon determining that the number of pointers that reference the primary transaction data container is greater than one, determining that the number of pointers that reference the secondary transaction data container is greater than one, and determining that the primary and secondary transaction data containers are the same transaction data containers.

12. The method of claim 3, wherein using the primary and secondary pointer counters and the primary and secondary transaction data containers to determine whether the first original pointer is altered further comprises:

determining a number of pointers that reference the primary transaction data container and a number of pointers that reference the secondary transaction data container using the primary and secondary pointer counters;

determining that the first original pointer is altered upon determining that the number of pointers that reference the primary transaction data container is equal to one, determining that the number of pointers that reference the secondary transaction data container is greater than one, and determining that the primary and secondary transaction data containers are not the same transaction data containers;

determining that the first original pointer is altered by no longer referencing the first transaction data container;

deleting the first original pointer from the original directory; and restoring the first original pointer in the original directory by copying the first corresponding archive pointer into the original directory or producing a new pointer in the original directory that references the first transaction data container.

13. The computer-program product of claim 5, wherein using the primary and secondary pointer counters and the primary and secondary transaction data containers to determine whether the first original pointer is altered further comprises:

determining a number of pointers that reference the primary transaction data container and a number of pointers that reference the secondary transaction data container using the primary and secondary pointer counters; and determining that the first original pointer is not altered upon determining that the number of pointers that reference the primary transaction data container is greater than one, determining that the number of pointers that reference the secondary transaction data container is greater than one, and determining that the primary and secondary transaction data containers are the same transaction data containers.

14. The computer-program product of claim 5, wherein using the primary and secondary pointer counters and the primary and secondary transaction data containers to determine whether the first original pointer is altered further comprises:

determining a number of pointers that reference the primary transaction data container and a number of pointers that reference the secondary transaction data container using the primary and secondary pointer counters;

determining that the first original pointer is altered upon determining that the number of pointers that reference the primary transaction data container is equal to one, determining that the number of pointers that reference the secondary transaction data container is greater than one, and determining that the primary and secondary transaction data containers are not the same transaction data containers;

determining that the first original pointer is altered by no longer referencing the first transaction data container;

deleting the first original pointer from the original directory; and restoring the first original pointer in the original directory by copying the first corresponding archive pointer into the original directory or producing a new pointer in the original directory that references the first transaction data container.

15. The method of claim 7, wherein using the primary and secondary pointer counters and the primary and secondary data containers to determine whether the first original pointer is altered further comprises:

determining a number of pointers that reference the primary data container and a number of pointers that reference the secondary data container using the primary and secondary pointer counters; and determining that the first original pointer is not altered upon determining that the number of pointers that reference the primary data container is greater than one, determining that the number of pointers that reference the secondary data container is greater than one, and determining that the primary and secondary data containers are the same data containers.

16. The method of claim 7, wherein using the primary and secondary pointer counters and the primary and secondary data containers to determine whether the first original pointer is altered further comprises:

determining a number of pointers that reference the primary data container and a number of pointers that reference the secondary data container using the primary and secondary pointer counters;

determining that the first original pointer is altered upon determining that the number of pointers that reference the primary data container is equal to one, determining that the number of pointers that reference the secondary data container is greater than one, and determining that the primary and secondary data containers are not the same data containers;

determining that the first original pointer is altered by no longer referencing the first data container;

deleting the first original pointer from the original directory; and restoring the first original pointer in the original directory by copying the first corresponding archive pointer into the original directory or producing a new pointer in the original directory that references the first data container.

17. The system of claim 8, wherein using the primary and secondary pointer counters and the primary and secondary data containers to determine whether the first original pointer is altered further comprises:

determining a number of pointers that reference the primary data container and a number of pointers that reference the secondary data container using the primary and secondary pointer counters; and determining that the first original pointer is not altered upon determining that the number of pointers that reference the primary data container is greater than one, determining that the number of pointers that reference the secondary data container is greater than one, and determining that the primary and secondary data containers are the same data containers.

18. The system of claim 8, wherein using the primary and secondary pointer counters and the primary and secondary data containers to determine whether the first original pointer is altered further comprises:

determining a number of pointers that reference the primary data container and a number of pointers that reference the secondary data container using the primary and secondary pointer counters;

determining that the first original pointer is altered upon determining that the number of pointers that reference the primary data container is equal to one, determining that the number of pointers that reference the secondary data container is greater than one, and determining that the primary and secondary data containers are not the same data containers;

determining that the first original pointer is altered by no longer referencing the first data container;

deleting the first original pointer from the original directory; and restoring the first original pointer in the original directory by copying the first corresponding archive pointer into the original directory or producing a new pointer in the original directory that references the first data container.

* * * * *